United States Patent
Ramadan et al.

(10) Patent No.: US 12,470,243 B2
(45) Date of Patent: Nov. 11, 2025

(54) TECHNIQUES FOR BEAM MANAGEMENT USING SENSOR COVERAGE

(71) Applicant: QUALCOMM Incorporated, San Diego, CA (US)

(72) Inventors: Yahia Ramadan, San Jose, CA (US); Raghu Narayan Challa, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/069,169

(22) Filed: Dec. 20, 2022

(65) Prior Publication Data

US 2024/0204815 A1  Jun. 20, 2024

(51) Int. Cl.
| | |
|---|---|
| H04B 1/3827 | (2015.01) |
| G06T 7/70 | (2017.01) |
| H04B 7/06 | (2006.01) |
| H04W 52/28 | (2009.01) |

(52) U.S. Cl.
CPC ............ H04B 1/3838 (2013.01); G06T 7/70 (2017.01); H04B 7/0695 (2013.01); H04W 52/283 (2013.01); *G06T 2207/30196* (2013.01)

(58) Field of Classification Search
CPC .......................... H04B 1/3838; H04B 7/0695; H04B 7/06952; H04W 52/283; H04W 52/246; H04W 52/367; H04W 52/42; H04W 52/146
See application file for complete search history.

(56) References Cited

U.S. PATENT DOCUMENTS

| | | | |
|---|---|---|---|
| 2018/0160377 A1* | 6/2018 | Abramsky | H04W 52/283 |
| 2020/0145090 A1* | 5/2020 | Sun | H04B 7/0695 |
| 2020/0259515 A1 | 8/2020 | Mueck | |

FOREIGN PATENT DOCUMENTS

WO   WO-2021155980 A1   8/2021

OTHER PUBLICATIONS

International Search Report and Written Opinion—PCT/US2023/081100—ISA/EPO—Mar. 21, 2024 (2206332WO).

\* cited by examiner

*Primary Examiner* — Ayodeji O Ayotunde
(74) *Attorney, Agent, or Firm* — Dalei Dong; Holland & Hart LLP

(57) ABSTRACT

Methods, systems, and devices for wireless communication are described. In some systems, a wireless device may detect, using a sensor at the wireless device, one or more locations at which human tissue may be present within a coverage area of the sensor. The wireless device may select, from a set of beams, a beam and a corresponding transmit power. The wireless device may select the beam and the corresponding transmit power based on the detection of the one or more locations at which the human tissue is present within the coverage area of the sensor and a radio frequency coverage area of the beam. The wireless device may transmit uplink data using the selected beam and the selected transmit power.

30 Claims, 14 Drawing Sheets

TECHNIQUES FOR BEAM MANAGEMENT USING SENSOR COVERAGE

FIELD OF DISCLOSURE

The present disclosure, for example, relates to wireless communication systems, more particularly to techniques for beam management using sensor coverage.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

To reduce radiation exposure to living objects, some wireless devices may comply with various constraints set by regulatory agencies. For example, a wireless device may be configured with radio frequency exposure limitations or thresholds to reduce possible exposure. An example of such a threshold may be a maximum permissible exposure (MPE) threshold, which may be measured as power density over a given area of human tissue. The wireless device may select a transmit power to use for communications based on the MPE threshold.

SUMMARY

The described techniques relate to improved methods, systems, devices, and apparatuses that support techniques for beam management using sensor coverage. For example, the described techniques provide for a wireless device to detect, using a sensor at the wireless device, one or more locations at which human tissue is present within a coverage are of the sensor. The wireless device may include a single sensor or two or more sensors collocated with antennas at the wireless device that operate collaboratively to detect human tissue. The wireless device may select, from among a set of beams, a beam and a corresponding transmit power to use for subsequent communications. The wireless device may select the beam and the transmit power based on the detection of the one or more locations at which human tissue may be present within the coverage area of the sensor and a radio frequency coverage area of the beam. In some examples, the wireless device may align the coverage area of the sensor with a respective radio frequency coverage area of each beam of the set of beams supported by the wireless device. The wireless device may determine (e.g., calculate) a transmit power for each beam based on a minimum distance at which human tissue is detected within the coverage area of the sensor after alignment with the respective radio frequency coverage area of the beam. The wireless device may select the beam based on the beam being associated with a highest transmit power from among the other beams of the set of beams, in some examples. The wireless device may transmit data using the selected beam and the selected transmit power. The wireless device may thereby comply with one or more radio frequency exposure thresholds, such as a maximum permissible exposure (MPE) threshold, while increasing transmit power and beam selection by using one or more sensors to detect human tissue.

A method for wireless communication at a wireless device is described. The method may include detecting, using a sensor at the wireless device, one or more locations at which human tissue is present within a coverage area of the sensor, selecting, from among a set of multiple beams, a beam and a corresponding transmit power, where the beam and the transmit power are selected based on the detection of the one or more locations at which the human tissue is present within the coverage area of the sensor and a radio frequency coverage area of the beam, and transmitting uplink data using the selected beam and the selected transmit power.

An apparatus for wireless communication at a wireless device is described. The apparatus may include a processor, memory coupled with the processor, and instructions stored in the memory. The instructions may be executable by the processor to cause the apparatus to detect, using a sensor at the wireless device, one or more locations at which human tissue is present within a coverage area of the sensor, select, from among a set of multiple beams, a beam and a corresponding transmit power, where the beam and the transmit power are selected based on the detection of the one or more locations at which the human tissue is present within the coverage area of the sensor and a radio frequency coverage area of the beam, and transmit uplink data using the selected beam and the selected transmit power.

Another apparatus for wireless communication at a wireless device is described. The apparatus may include means for detecting, using a sensor at the wireless device, one or more locations at which human tissue is present within a coverage area of the sensor, means for selecting, from among a set of multiple beams, a beam and a corresponding transmit power, where the beam and the transmit power are selected based on the detection of the one or more locations at which the human tissue is present within the coverage area of the sensor and a radio frequency coverage area of the beam, and means for transmitting uplink data using the selected beam and the selected transmit power.

A non-transitory computer-readable medium storing code for wireless communication at a wireless device is described. The code may include instructions executable by a processor to detect, using a sensor at the wireless device, one or more locations at which human tissue is present within a coverage area of the sensor, select, from among a set of multiple beams, a beam and a corresponding transmit power, where the beam and the transmit power are selected based on the detection of the one or more locations at which the human tissue is present within the coverage area of the sensor and a radio frequency coverage area of the beam, and transmit uplink data using the selected beam and the selected transmit power.

Some examples of the method, apparatuses, and non-transitory computer-readable medium described herein may further include operations, features, means, or instructions for aligning, for each beam of the set of multiple beams supported by the wireless device, at least a portion of the coverage area of the sensor with a respective radio frequency coverage area, where selecting the beam and the transmit power may be based on aligning a first portion of the coverage area of the sensor with the radio frequency coverage area of the beam.

In some examples of the method, apparatuses, and non-transitory computer-readable medium described herein, aligning the first portion of the coverage area of the sensor with the radio frequency coverage area of the beam may include operations, features, means, or instructions for determining a maximum allowable distance from the sensor for beam management, where a probability that the sensor will detect a presence of the human tissue at any distance less than the maximum allowable distance may be greater than or equal to a threshold probability and determining a maximum area over which a total maximum effective isotropic power radiated from the wireless device using the beam satisfies a threshold effective isotropic radiated power (EIRP) condition, where the maximum area corresponds to a range of angular coordinates, and where the first portion of the coverage area of the sensor includes all points included in a volume defined by the maximum allowable distance from the sensor and the range of angular coordinates.

Some examples of the method, apparatuses, and non-transitory computer-readable medium described herein may further include operations, features, means, or instructions for determining a difference between the total maximum effective isotropic power radiated from the wireless device using the beam and a maximum effective isotropic power radiated from the wireless device using the beam at angular coordinates outside of the range of angular coordinates associated with the maximum area, where the threshold EIRP condition corresponds to the difference being greater than or equal to a threshold, the threshold based on the maximum allowable distance and a second distance associated with a MPE limit in an absence of the sensor for the wireless device.

Some examples of the method, apparatuses, and non-transitory computer-readable medium described herein may further include operations, features, means, or instructions for determining that a subset of the one or more locations at which the human tissue may be present may be included in the first portion of the coverage area of the sensor that may be aligned with the radio frequency coverage area of the beam, where each location may be associated with a respective distance from the sensor, determining, from among the subset of the one or more locations, a first location based on a first distance from the sensor to the first location being less than other distances from the sensor to other locations of the subset of the one or more locations, and determining the transmit power for the beam based on the first distance from the sensor to the first location.

In some examples of the method, apparatuses, and non-transitory computer-readable medium described herein, selecting the beam may include operations, features, means, or instructions for selecting, from among the set of multiple beams supported by the wireless device, a subset of one or more beams based on absence of the detected human tissue within respective coverage areas associated with the subset of one or more beams and selecting the beam from among the subset of one or more beams based on a reference signal received power (RSRP) of the beam being greater than other RSRPs of other beams of the subset of one or more beams.

In some examples of the method, apparatuses, and non-transitory computer-readable medium described herein, selecting the beam may include operations, features, means, or instructions for selecting the beam based on a signal-to-noise ratio (SNR) associated with the beam being greater than other SNRs associated with other beams of the set of multiple beams supported by the wireless device.

Some examples of the method, apparatuses, and non-transitory computer-readable medium described herein may further include operations, features, means, or instructions for determining the transmit power for the beam based on the one or more locations at which the human tissue may be present within the sensor coverage for the beam, a maximum allowable distance from the sensor for the beam, a distance associated with a MPE limit in an absence of the sensor for the wireless device, a reference maximum transmit power limit for the beam in an absence of the sensor, a normalized power density limit for a subsequent uplink transmission interval, and a configured time-division duplex uplink duty cycle, where the transmit power includes a maximum transmit power for the beam and determining the SNR based on the maximum transmit power for the beam, a maximum radio frequency transmit power limit for the wireless device, and a pathloss associated with the beam.

Some examples of the method, apparatuses, and non-transitory computer-readable medium described herein may further include operations, features, means, or instructions for detecting respective locations of one or more objects within the coverage area of the sensor, determining, based on a machine learning algorithm, whether the one or more detected objects include the human tissue, where detecting the one or more locations at which the human tissue may be present may be based on the machine learning algorithm, and storing, at the wireless device, the one or more locations at which the human tissue may be present based on the determining, where each of the one or more locations may be associated with a respective distance from the sensor and a respective angular position in a coordinate system associated with the sensor.

Some examples of the method, apparatuses, and non-transitory computer-readable medium described herein may further include operations, features, means, or instructions for detecting respective locations of one or more objects within the coverage area of the sensor, monitoring the respective locations of the one or more objects for a threshold time period, and determining whether the one or more objects include the human tissue based on monitoring the respective locations of the one or more objects during the threshold time period, where detecting the one or more locations at which the human tissue may be present may be based on determining whether the one or more objects include the human tissue.

Some examples of the method, apparatuses, and non-transitory computer-readable medium described herein may further include operations, features, means, or instructions for storing, at the wireless device, a first location of a first object of the one or more detected objects based on the first location of the first object moving by at least a threshold distance within the threshold time period, where the one or more locations include at least the first location.

Some examples of the method, apparatuses, and non-transitory computer-readable medium described herein may further include operations, features, means, or instructions for determining that a first object of the one or more detected objects does not include the human tissue based on the first object remaining within a threshold distance of a first location of the first object during the threshold time period, where the one or more locations exclude the first location based on the determining.

In some examples of the method, apparatuses, and non-transitory computer-readable medium described herein, detecting the one or more locations at which the human tissue may be present may include operations, features, means, or instructions for detecting, using one or more cameras that may be collocated with the wireless device, the one or more locations at which the human tissue may be present, where the sensor includes the one or more cameras.

In some examples of the method, apparatuses, and non-transitory computer-readable medium described herein, each location of the one or more locations corresponds to a respective distance of the human tissue from the sensor and a respective angular position of the human tissue in a coordinate system associated with the sensor and the respective angular position corresponds to an azimuth angle and a polar angle in the coordinate system.

DETAILED DESCRIPTION

Figure 1:
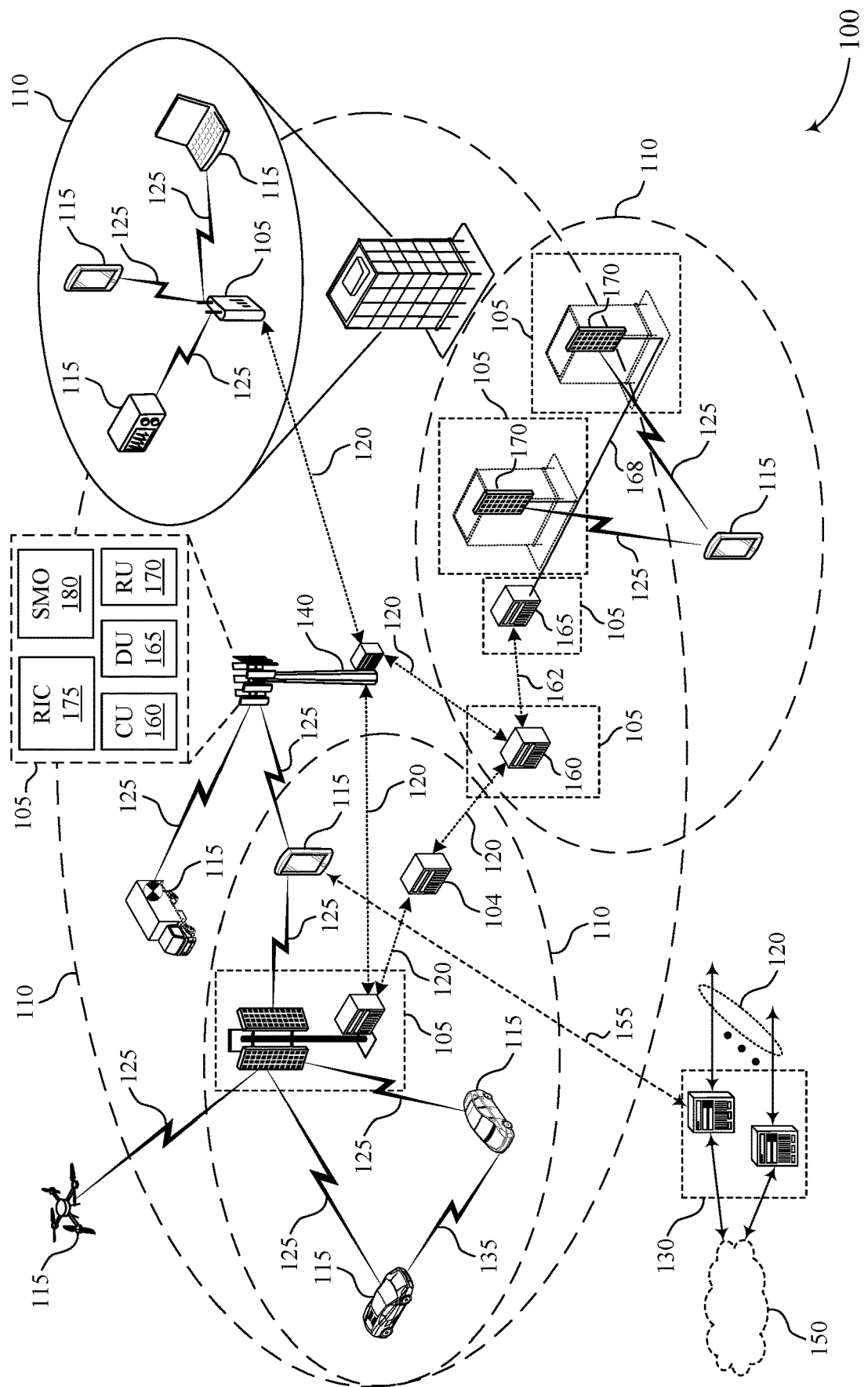
FIG. 1 illustrates an example of a wireless communications system that supports techniques for beam management using sensor coverage in accordance with various aspects of the present disclosure.

In some systems, transmissions by wireless devices may be based on (e.g., limited or constrained by) one or more radio frequency exposure thresholds, such as a maximum permissible exposure (MPE) guideline or threshold, among other types of radio frequency exposure thresholds. The MPE may correspond to a power density exposed to human tissue in units of milli-Watts (mW) per square centimeter ($cm^2$), and may be used to reduce radio exposure to nearby human or living tissue. To ensure compliance with the MPE threshold, a wireless device may determine a maximum transmission power for a next time interval based on an available power density budget at the wireless device, a power density limit, and a power density of previous transmissions by the wireless device. In some cases, a wireless device may use radar and reflected signals to determine whether human tissue is present. The wireless device may adjust beams and other transmission parameters based on the detected human tissue to increase transmit power while satisfying the MPE threshold. However, in some cases, such radar techniques may be inaccurate or inefficient.

Techniques of the present disclose provide for a wireless device to use one or more sensors (e.g., a camera, a heat sensor, some other type of sensor, or any combination thereof) to detect human tissue and perform beamforming management procedures based on the detected human tissue. The wireless device may use the one or more sensors to detect objects within a vicinity of the wireless device. The wireless device may use machine learning or other mechanisms to determine which of the detected objects include human or living tissue. The wireless device may store a location of each object that includes the human or living tissue. The location may be defined by a distance from the wireless device and a corresponding angular position associated with each object that includes the human tissue. To perform beam management using the one or more sensors, the wireless device may overlay or align a radio frequency exposure area of each traffic beam with a coverage area of the one or more sensors. To align the sensor coverage area with the radio frequency exposure of a given beam, the wireless device may determine a maximum area or volume within which a probability of detection of human tissue and a total radiated transmit power of the beam both satisfy respective thresholds.

The wireless device may use the detected locations at which human tissue is present and the aligned sensor coverage area of each beam to determine a maximum transmit power that may be used for transmitting with each beam while maintaining or satisfying the MPE threshold. The wireless device may select different uplink beams, or steer an uplink beam in a different direction, based on the detected locations of human tissue and the maximum transmit powers for a given beam. The wireless device may thereby use one or more sensors collocated with transmit antennas at the wireless device to detect human tissue and select a transmit beam and corresponding transmit power for subsequent transmissions while satisfying an MPE threshold based on the detected human tissue.

Aspects of the disclosure are initially described in the context of wireless communications systems. Additional aspects of the disclosure are described with reference to a wireless communication system, sensor configurations, and a process flow. Aspects of the disclosure are further illustrated by and described with reference to apparatus diagrams, system diagrams, and flowcharts that relate to techniques for beam management using camera coverage.

FIG. 1 illustrates an example of a wireless communications system 100 that supports techniques for beam management using sensor coverage in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, radio frequency functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for beam management using sensor coverage as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the radio frequency spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed radio frequency spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some systems, transmissions by wireless devices (e.g., a UE 115, a network entity 105, a customer-premises equipment (CPE), or some other type of wireless device) may be based on (e.g., limited or constrained by) one or more radio frequency exposure thresholds, such as a MPE guideline or threshold. The MPE threshold may correspond to a power density exposed to human tissue in the units of mW per $cm^2$, and may be used to reduce radio exposure to nearby human or living tissue. To ensure compliance with the MPE threshold, a wireless device may determine a maximum transmission power for a next time interval based on an available power density budget at the wireless device, a power density limit, and a power density of previous transmissions by the wireless device. In some cases, a wireless device may use radar and reflected signals to determine whether human tissue is present. The wireless device may adjust beams and other transmission parameters based on the detected human tissue to increase transmit power while satisfying the MPE threshold. However, in some cases, such radar techniques may be inaccurate or inefficient.

Techniques of the present disclose provide for a wireless device to use a sensor (e.g., a camera, a heat sensor, some other type of sensor, or any combination thereof) to detect human tissue and perform beamforming management procedures based on the detected human tissue. The wireless device may use the one or more sensors to detect objects within a vicinity of the wireless device. The wireless device may use machine learning or other mechanisms to determine which of the detected objects include human or other living tissue. The wireless device may store a location of each object that includes the human or living tissue. The location may be defined by a distance from the wireless device and a corresponding angular position associated with each object that includes the human tissue. To perform beam management using the one or more sensors, the wireless device may overlay or align a radio frequency exposure area of each traffic beam with a coverage area of the one or more sensors. To align the sensor coverage area with the radio frequency exposure of a given beam, the wireless device may determine a maximum area or volume within which a probability of detection of human tissue and a total radiated transmit power of the beam both satisfy respective thresholds.

The wireless device may use the detected locations at which human tissue is present and the aligned sensor coverage area of each beam to determine a maximum transmit power that may be used for transmitting with each beam while maintaining or satisfying the MPE threshold. The wireless device may select different uplink beams, or steer an uplink beam in a different direction, based on the detected locations of human tissue and the maximum transmit powers for a given beam. The wireless device may thereby use one or more sensors collocated with transmit antennas at the wireless device to detect human tissue and select a transmit beam and corresponding transmit power for subsequent transmissions while satisfying an MPE threshold based on the detected human tissue.

Figure 2:
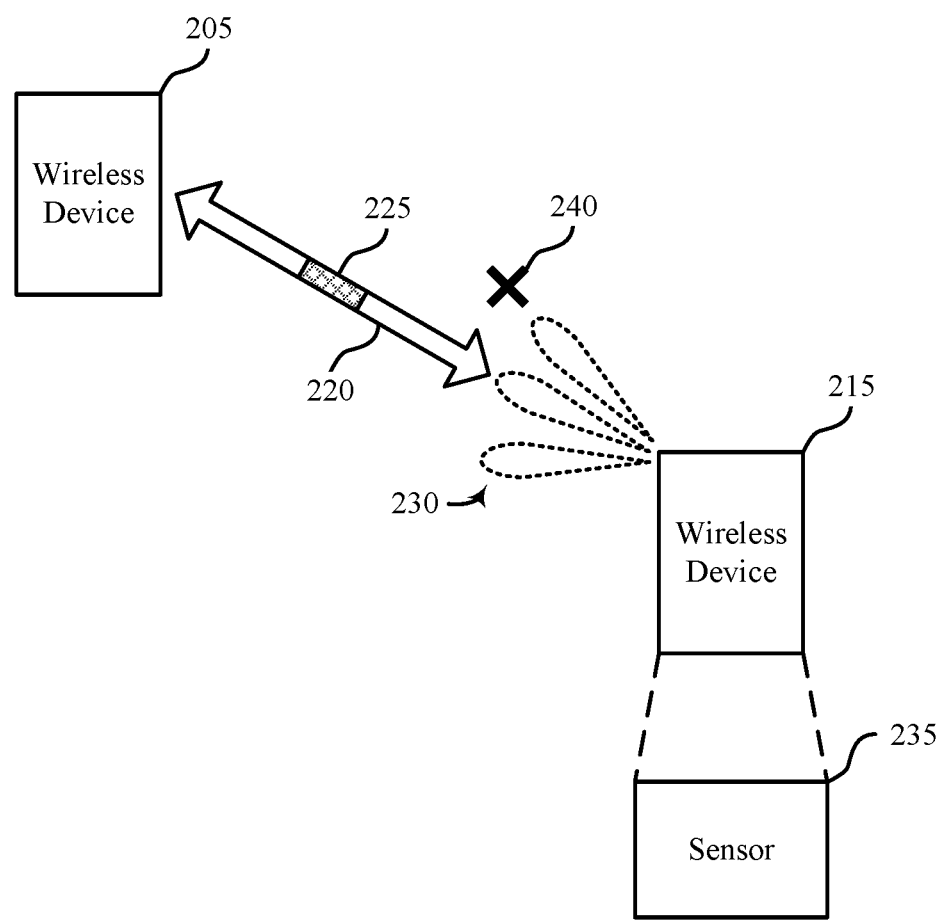
FIG. 2 illustrates an example of a wireless communication system that supports techniques for beam management using sensor coverage in accordance with various aspects of the present disclosure.

FIG. 2 illustrates an example of a wireless communication system 200 that supports techniques for beam management using camera coverage in accordance with various aspects of the present disclosure. In some examples, the wireless communication system 200 may implement or be implemented by the wireless communication system 100. For example, the wireless communication system 200 may include a wireless device 215 and a wireless device 205, which may represent examples of UEs 115, network entities 105, CPEs, some other wireless devices, or any combination thereof as described herein. In this example, the wireless device 215 may communicate with the wireless device 205 via a communication link 220 (e.g., a Uu link, a sidelink, a backhaul link, or some other type of communication link). In this example, the wireless device 215 may be capable of using a sensor 235 at the wireless device 215 to detect one or more objects 240 and perform beam management.

The wireless device 215 may transmit data 225 over the communication link 220 using antennas of an antenna panel at the wireless device 215. In some examples, the wireless device 215 may deploy multiple antennas at the antenna panel to transmit the data 225 to the wireless device 205. As such, the wireless device 215 may transmit the data via one or more beams 230. The beams 230 at the wireless device 215 may be associated with the multiple antennas at the antenna panel. For example, a beam 230 may be associated with a single antenna, a group of antennas (e.g., an antenna array or an antenna sub-array), or the antenna panel as a whole. In some cases, the beams 230 may also be referred to as candidate beams or traffic beams. The wireless device 215 may use the beams 230 to transmit the data 225 over the communication link 220 while complying with the MPE regulations.

In some examples, the wireless communication system 200 may configure to support one or more radio frequency exposure regulations. Wireless devices in the wireless communication system 200 may dynamically adjust transmit power limits to comply with the radio frequency exposure regulations. For example, in some systems (e.g., mmW systems or other frequency systems), an MPE threshold or limit may be applied to reduce or limit radio frequency exposure from wireless devices to nearby human tissue. That is, uplink transmission power may be moderated based on the MPE limit (e.g., an amount of non-ionizing radiation that may be permitted to be exposed to human or living tissue). The MPE limit may be measured by a power density in units mWatt/cm$^2$. In some examples, the radio frequency exposure regulations may be imposed by regulators such as the federal communications commission (FCC) or the international commission on non-ionizing radiation protection (IC-NIRP), or some other regulation agency.

To comply with the MPE limit, the wireless devices 205 and 215 may determine a maximum transmission power for a transmission in a next or subsequent time interval (e.g., a TTI) based on an available power density budget. In some cases, the wireless devices 205 and 215 may compute or calculate the available power density budget based on a maximum input power limit, a power density limit, and a power density consumption accumulated from previous transmission activities. Such transmission activities may occur over a communication link 220 between the wireless device 215 and the wireless device 205. In some cases, if the wireless device 215 determines the maximum transmission power for a subsequent transmission based on an available power density budget, the determined maximum transmission power may be relatively low. For example, the determined maximum transmission power may assume that human tissue is near the device, but may not account for actual locations of human tissue, which may reduce throughput of communications, in some examples.

In some cases, the wireless device 215 may transmit one or more radar or lidar signals. The signals may bounce off of objects 240 in a vicinity of the wireless device 215, and the wireless device 215 may measure one or more parameters associated with the received radar and lidar signals. The wireless device 215 may determine approximate locations of objects 240 in the vicinity of the wireless device 215 based on measuring the reflected signals. However, reliability associated with using such reflected signals may be relatively low, in some examples.

Techniques, systems, and devices described herein provide for improved MPE compliance by the wireless device 215 using a sensor 235. The sensor 235 may be, for example, a camera, a heat sensor, or some other type of sensor 235. The wireless device 215 may use the sensor 235 to detect the presence of one or more objects 240 in a vicinity of the wireless device 215 (e.g., within a sensor coverage area), determine whether the objects 240 are human tissue, and adjust one or more beams 230, a transmit power, or both based on the detected human tissue and MPE regulations. In some examples, the sensor 235 may be a single sensor 235 or a set of multiple sensors 235 collocated at the wireless device 215 and working in a cooperation mode. The devices described herein (e.g., the wireless device 215) may overlay a radio frequency exposure of each beam of a set of beams with the view of the sensor(s) 235 to determine a maximum distance for each beam of the set of beams 230 to satisfy the MPE power density limits. Such process may be considered a sensor view characterization process and may be further described in further detail elsewhere herein, including with reference to FIG. 3.

The techniques described herein may additionally, or alternatively, support the wireless device 215 performing beam management based on the detected locations of human tissue. For example, the wireless device 215 may determine a minimum distance at which human tissue is detected and a maximum transmit power for each beam of the set of beams 230. The wireless device 215 may steer the beams 230 to avoid an object 240 that includes human tissue or may select a best uplink beam to maximize uplink SNR and transmission power based on the determined transmit power for each beam. The higher transmission power may also result in the wireless device 215 supporting wider cell coverage or a higher uplink throughput in the wireless communication system 200. Techniques for selecting uplink beams and corresponding transmission powers are described in further detail elsewhere herein, including with reference to FIG. 4.

In some examples, the wireless device 215 may determine whether the detected objects 240 include human or living tissue. If the wireless device 215 detects an object 240 and determines the object 240 includes human tissue, a transceiver at the wireless device 215 may reduce a transmission power of the wireless device 215 based on a location of the detected human tissue to comply with the MPE threshold and reduce exposure to the human tissue. In some examples, if the wireless device 215 detects that the object 240 contains human tissue, the wireless device 215 may steer one or more uplink beams in a different direction to avoid or reduce exposure to the object 240 including the human tissue, or the wireless device 215 may select a new uplink beam to maintain a relatively high transmission power and maximize the SNR of the wireless device 215, or both. If the sensor 235 at the wireless device 215 detects an object 240 and determines that the object 240 does not include human tissue, the transceiver at the wireless device 215 may increase a transmission power accordingly (e.g., based on an absence of human tissue near the wireless device 215).

The techniques for detecting human tissue and performing beam management using a sensor 235 of a device, as described herein, may support improved wireless communications between wireless devices in the wireless communication system 200. For example, by detecting human tissue using a sensor 235 and switching beams 230, uplink transmit power, or both based on the detected human tissue, the wireless devices may increase uplink throughput, communication reliability, and cell coverage, among other advantages.

Figure 3:
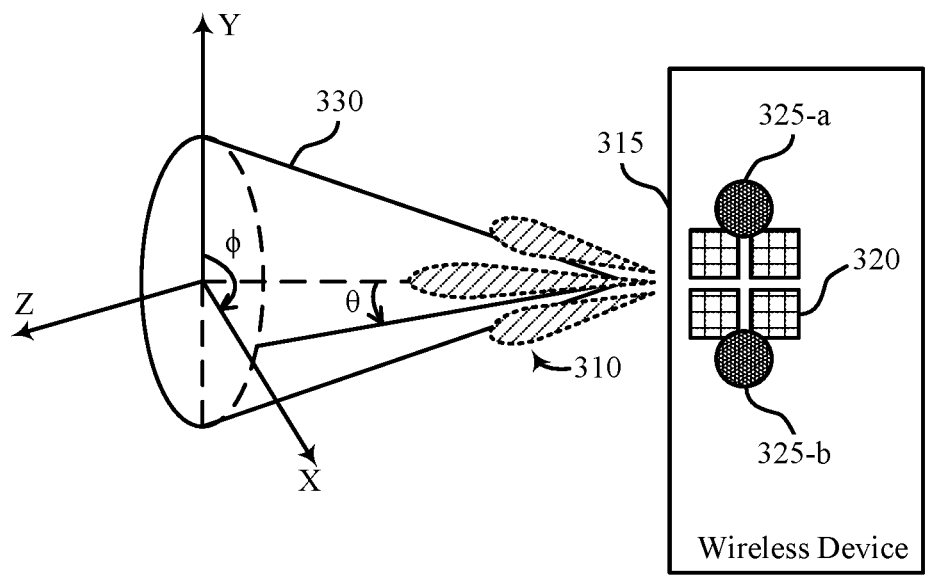
FIG. 3 illustrates an example of a sensor configuration that supports techniques for beam management using sensor coverage in accordance with various aspects of the present disclosure.

FIG. 3 illustrates an example of a sensor configuration 300 that supports techniques for beam management using camera coverage in accordance with various aspects of the present disclosure. In some examples, the sensor configuration 300 may implement or be implemented by the wireless communication systems 100 and 200, as described with reference to FIGS. 1 and 2. For example, the sensor configuration 300 may include a wireless device 315 which may represent examples of corresponding wireless devices described herein. The wireless device 315 may be an example of a UE 115, a network entity 105, a CPE, or some other wireless device.

In some cases, the wireless device 315 may include one or more antenna components 320 (e.g., modules, elements, arrays, or the like). The antenna components 320 may represent examples of an antenna panel, a subarray, an array, a group of antenna elements, or any combination thereof. Each antenna component 320 may correspond to one or more beams used to transmit data by the wireless device 315. For example, the wireless device 315 may transmit data using the antenna components 320 and in the direction of (e.g., using or via) one or more beams, which may represent examples of the beams 230 described with reference to FIG. 2. Each beam may be associated with a respective radio frequency exposure coverage area 310. In the example of FIG. 3, the illustrated radio frequency exposure coverage area 310 may be an example of a radio frequency exposure coverage area 310 associated with transmissions using a single traffic beam.

The wireless device 315 may be configured with or may operate in accordance with one or more radio frequency exposure regulations, such as an MPE threshold, as described with reference to FIG. 2. In some examples, an MPE power density limit for the wireless device 315 may be applicable to objects that are at least a distance, $d_0$, and beyond from the wireless device 315 (e.g., measured in centimeters (cm) or some other unit). For example, a device that is not configured with a sensor for detecting human tissue may assume that human tissue will not be closer than the distance $d_0$. In some cases, the distance $d_0$ may be applicable to wireless devices such as a CPE, IoT devices, or another type of wireless device that may be relatively stationary (e.g., at a fixed location). The distance $d_0$ may not change during operation of the device. In such cases, the MPE power density limits may be applicable at the distance $d_0$ and beyond. For example, the device may determine a transmit power to apply based on the MPE limit for communications by assuming there is human tissue at the distance $d_0$ and further from the device. In one example, if the distance $d_0$ is equal to 20 cm, a device that is not capable of detecting human tissue may assume that there will be no human tissue within 20 cm of the device. The device may select a transmit power such that human tissue located more than the $d_0$ distance from the device may not be affected by the isotropic radiated power from a traffic beam produced by the device using the selected transmit power. However, if a wireless device, such as the wireless device 315 is capable of detecting human tissue and determines that human tissue is located at a distance greater than do, the wireless device 315 may be able to increase the transmission power while maintaining compliance with the MPE power density limit, which may improve throughput and communication reliability.

The techniques described herein may support the wireless device 315 using one or more sensors 325 (e.g., a sensor 325-$a$ and a sensor 325-$b$) that are collocated with one or more antenna components 320 of the wireless device 315 to detect objects near the wireless device 315. The wireless device 315 may uses the sensors 325 to determine if each detected object contains human tissue. If the object does contain human tissue, the wireless device 315 may increase or reduce transmission power or manage uplink beams (e.g., traffic beams of the wireless device 315) to maintain relatively higher transmission powers and throughput when objects containing human tissue are beyond the distance $d_0$.

To use the sensors 325 to detect the presence of human tissue, the sensor view (e.g., the sensor coverage area 330) may be characterized per each traffic beam supported by the wireless device 315. The traffic beams may be indexed by j. The characterization process may be referred to a sensor view characterization process in some examples herein. The sensor view characterization process may be performed offline or during a manufacturing process of the wireless device 315 (e.g., by an original equipment manufacturer (OEM)) prior to deployment of the wireless device 315. In the illustrated figure, a radio frequency exposure coverage area 310 may represent the exposure coverage area for a traffic beam j of a set of traffic beams (e.g., the set of beams 230 described with reference to FIG. 2). As part of the sensor view characterization process, the radio frequency exposure coverage area 310 of the traffic beam j may be overlayed with a sensor coverage area 330 for the respective traffic beam j. The sensor coverage area 330 may be the coverage of the sensors 325 used to perform beam management for a given traffic beam j.

To perform the sensor view characterization process, the wireless device 315 may determine, for each traffic beam j, a maximum distance decision $d_{max,j}$ and a corresponding sensor spatial coverage area $S_{d_{max,j}}$. The maximum distance decision $d_{max,j}$ may correspond a maximum distance within which the sensor(s) 325 of the wireless device 315 are capable of detecting an object (e.g., human tissue) with at least a threshold confidence level. The sensor spatial coverage area $S_{d_{max,j}}$ may be the maximum coverage area of the sensors 325 (e.g., the sensor coverage area 330 illustrated in FIG. 3) for the traffic beam j such that any radio frequency exposure leakage outside the sensor coverage area 330 may be below the MPE power density threshold. The sensor spatial coverage area may be defined by the maximum distance and a range of angles in a spherical coordinate system spanning x, y, and z planes, the spherical coordinate system associated with (e.g., originating at) the one or more sensors 325. In some cases, the spherical coordinate system may use an angular position in association with a distance, corresponding to an azimuth angle and a polar angle in a coordinate system. The polar angle θ may refer to the inclination of the object with respect to the x and y planes. The azimuth angle φ may refer to a rotation around a zenith angle ϕ, which may correspond to the z axis and plane of the spherical coordinate system. The azimuth angle may be associated with an angular measurement in spherical coordinate systems such as illustrated. The wireless device 315 may use such angles θ and y to determine the angular position on an object within the sensor coverage area 330 during the sensor view characterization process.

In some examples, the sensor spatial coverage area may be such that any radio frequency exposure leakage outside the sensor coverage area 330 may maintain the MPE power density limit. For example, there may be one or more blind spots (e.g., outside of the sensor coverage area 330) where human tissue may be present and within the radio frequency exposure coverage area 310 of a given beam, but may not be detectable by the sensors 325. In such cases, the MPE power density limits may still apply to the non-detectable human tissue. The wireless device 315 may account for a possibility of human tissue being within a blind spot of the sensors when selecting transmission power. As such, the sensor spatial coverage area, $S_{d_{max,j}}$ may be equal to a maximum coverage area such that if human tissue is not detected within the sensor spatial coverage area (e.g., between the sensor 325 and the distance $d_{max,j}$), and the wireless device 315 increases transmit power accordingly, any human tissue outside of the sensor coverage area may not be exposed to radiation above the MPE threshold.

In some examples, the wireless device 315 may determine these values such that the probability (Pd) of detecting human tissue at $d_{max,j}$ within the coverage area $S_{d_{max,j}}$ meets or exceeds a target confidence level, $Pd_{TRGT}$. Equation 1 represents an example function for determining a value of $d_{max,j}$.

$$Pd(\theta, \varphi, d_{max,j}) \geq Pd_{TRGT}, \forall (\theta, \varphi) \in s_{d_{max,j}} \quad (1)$$

In the example of Equation 1, the wireless device 315 may determine that the probability of detecting human tissue within all angles (θ, φ) of the spherical coordinate system at the distance $d_{max,j}$ may be greater than or equal to the target confidence level, $Pd_{TRGT}$. The wireless device 315 may set the target confidence level, or may be configured with the target confidence level (e.g., via control signaling or some other configuration). The target confidence level may be set to 90%, for example, or some other level. If the probability of detecting the human tissue between all angles within the maximum sensor spatial coverage area $S_{d_{max,j}}$ at the distance $d_{max,j}$ is lower than the target confidence level, $Pd_{TRGT}$, the wireless device 315 may determine a new distance $d_{max,j}$ that is closer to the sensor at the wireless device 315. The wireless device 315 may thereby iteratively calculate an adequate maximum distance for detecting human tissue.

The described techniques for calculating the maximum distance may provide for improved transmit power selection, throughput, and reliability of communications. For example, if a device is not equipped with sensors 325 and the capability to detect human tissue, the value of $d_{max,j}$ may be set equal to a constant or threshold value, $d_0$. However, as described in the present disclosure, if the wireless device 315 is configured with sensors 325, the wireless device 315 may, in some examples, detect objects at a greater distance than $d_0$ and may set $d_{max,j}$ to be greater than $d_0$ accordingly. Such an increased distance may provide for the wireless device to increase transmit power while maintaining compliance with MPE thresholds. Thus, such techniques may support the wireless device 315 increasing the transmit power in cases where no objects are detected, or objects are detected relatively far away. In one example, the value of $d_{max,j}$, may be equal to 35 cm, or some other distance. If the wireless device 315 does not detect any objects including human tissue within 35 cm of the wireless device 315, the wireless device may increase a transmission power. Additionally, or alternatively, if the wireless device 315 detects an object further than $d_{max,j}$, the wireless device 315 may still increase the transmission power as if there is no object detected as the transmission power ensures that the MPE limit is met at 35 cm and below. That is, by determining $d_{max,j}$, the wireless device 315 may increase the transmission power if human tissue is not detected or is relatively far away, and may be more efficient than using the value of do.

In some examples, at least a portion of the radio frequency exposure coverage area 310 of the beam produced by the wireless device 315 may be outside of the sensor coverage area 330 (e.g., radio frequency exposure leakage from the traffic beam). By aligning the sensor coverage area 330 with the radio frequency exposure coverage area 310, the wireless device 315 may reduce radio frequency exposure leakage to ensure that the wireless device 315 complies with MPE regulations both within and outside of the sensor coverage area 330. To determine that the radio frequency exposure leakage outside the sensor coverage area 330 is below the MPE power density limit at the determined $d_{max,j}$ distance, the wireless device 315 may determine a maximum angular range for the sensor coverage area 330 (e.g., a maximum surface area of the sensor coverage area 330 at the distance $d_{max,j}$). The maximum angular range may be determined such that a difference between a maximum effective isotropic radiated power (EIRP), measured in dBm, for the traffic beam j, produced across all angles (e.g., ∇(θ,φ)) and a maximum EIRP for angles that are outside of (e.g., excluded from) the sensor coverage area 330 surface area (e.g., $\nabla(\theta,\varphi) \notin S_{d_{max,j}}$) is greater than or equal to a threshold value. Equation 2 represents an example function for determining the maximum angular range of the sensor coverage area 330 (e.g., $S_{d_{max,j}}$).

$$\max_{\forall(\theta,\varphi)} EIRP_j(\theta, \varphi) - \max_{\forall(\theta,\varphi) \notin S_{d_{max,j}}} EIRP_j(\theta, \varphi) \geq 10\log_{10} \frac{d_{max,j}^2}{d_0^2} \quad (2)$$

In the example of Equation 2, the difference between the total maximum EIRP produced by the wireless device 315 and the maximum EIRP produced outside of the maximum sensor coverage area 330 should be greater than or equal to the threshold value to reduce or minimize a leakage of radio frequency exposure. As such, the sensor view characterization described herein may minimize a probability that human tissue is in the radio frequency exposure coverage area 310 but not in the sensor coverage area 330 and the traffic beam j transmission power in the direction of the human tissue exceeds the MPE power density limit.

By using the sensor view characterization process described herein, the wireless device 315 may be able to accurately detect human tissue by overlaying the radio frequency exposure coverage area 310 with the sensor coverage area 330. Techniques for detecting that an object within the sensor coverage area 330 is human tissue, determining a transmission power, and selecting a beam of the set of beams to use based on the aligned sensor coverage area 330 may be described in further detail elsewhere herein, including with reference to FIG. 4.

Figure 4:
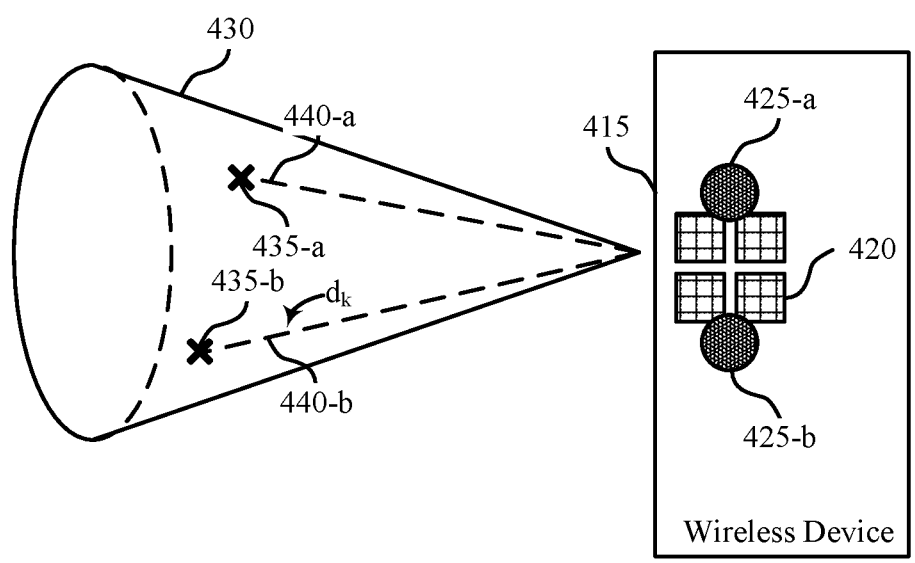
FIG. 4 illustrates an example of a sensor configuration that supports techniques for beam management using sensor coverage in accordance with various aspects of the present disclosure.

FIG. 4 illustrates an example of a sensor configuration 400 that supports techniques for beam management using camera coverage in accordance with various aspects of the present disclosure. In some examples, the sensor configuration 400 may implement or be implemented by the wireless communication systems 100 or 200 as described with reference to FIGS. 1 and 2 or the sensor configuration 300 described with reference to FIG. 3. For example, the sensor configuration 400 may include a wireless device 415 which may represent examples of corresponding devices described herein. The wireless device 415 may be an example of a UE 115 or a CPE, or some other type of device. The wireless device 415 may perform a sensor view characterization process to align one or more sensors 425 (e.g., sensors 425-a and 425-b) at the wireless device 415 with a radio frequency coverage area of each beam of a set of beams supported by the wireless device 415, as described elsewhere herein, including with reference to FIG. 3. In this example, the wireless device 415 may use the sensors 425, after the sensor view characterization process is performed, to detect human tissue, determine a transmit power, and perform beam management based on the detected human tissue.

Using the techniques described herein, the wireless device 415 may use one or more sensors 425, collocated with multiple antenna components 420 at the wireless device 415, to detect objects 435 (e.g., an object 435-a and an object 435-b). To comply with the regulated MPE power density limits, the wireless device 415 may determine if the objects 435 include human tissue, because the MPE power density limits may be applicable to human tissue. The wireless device 415 may detect objects 435 within each sensor coverage area supported by the wireless device 415. For example, the sensors 425 may be aligned with each beam of a set of multiple beams supported by the wireless device 415, and the wireless device 415 may detect objects 435 that are located within any of the aligned sensor coverage areas, including the sensor coverage area 430 illustrated in FIG. 4.

In some examples, the wireless device 415 may use a machine learning approach to determine whether objects 435 detected by the sensor 425 include human tissue. For example, a machine learning algorithm may be trained to determine whether detected objects are human tissue. In some cases, the machine learning algorithm may be a supervised machine learning algorithm and may be trained during a manufacturing process of the wireless device 415 (e.g., pre-trained before deployment of the wireless device 415 in the field). In some other cases, the machine learning algorithm may be an unsupervised machine learning algorithm and may learn by detecting human tissue after the wireless device 415 is deployed. While detecting the objects 435 in the sensor coverage area 430, the machine learning algorithm may assign a confidence level (e.g., a value between 0 and 1, with a higher value indicating a higher confidence) to each object 435, based on the confidence that the object 435 contains human tissue. For example, the machine learning algorithm may assign a confidence level of 0.9 to the object 435-a and a confidence level of 0.4 to the object 435-b. If a confidence level for an object 435 is greater than the confidence level threshold (e.g., a confidence level threshold of 0.5), the wireless device 415 may determine that the object 435 includes human tissue. As such, the machine learning algorithm may determine that the object 435-a, which is located at a distance 440-a away from the wireless device 415, includes human or other living tissue and the object 435-b, which is located at a distance 440-b away from the 415, is a non-living object based on the assigned confidence levels. Accordingly, the wireless device 415 may add the distance 440-a (e.g., distance $d_k$, where k may represent an index of the object 435-a) corresponding to the living object 435-a to a list D of distances for detected objects (e.g., D=D∪$d_k$) and add angles $\theta_k$ and $\varphi_k$ of the detected object 435-a within a coordinate system associated with the sensors 425 to respective lists θ and D. The lists of distances and angles may be stored as databases, tables, or sets of pointers within a memory of the wireless device 415.

In some other examples, the wireless device 415 may initially assume that every newly detected object 435 includes human tissue. If the wireless device 415 detects any object 435, the wireless device 415 may add the distance 440 at which the object 435 is detected to the list D of distances for detected objects (e.g., D=D∪$d_k$) and add angles $\theta_k$ and $\varphi_k$ of the detected object 435 to the lists θ and Φ. The wireless device 415 may track movement of the objects 435 that are stored in the dynamic lists D, θ, and Φ. If an object 435, such as the object 435-b, does not move by a threshold distance (e.g., x millimeters or some other distance) within a threshold time period (e.g., y seconds or some other time period), the wireless device 415 may treat the object 435-b as a non-living object and may remove the distance 440-b and the corresponding angles of the object 435-b from the lists D, θ, and Φ (e.g., D=D−$d_k$, θ=θ−$\theta_k$, and Φ=Φ−$\varphi_k$.).

The wireless device 415 may use the detected locations of human tissue to perform beam management. In some examples, the wireless device 415 may obtain radio frequency measurements for each traffic beam supported by the wireless device 415, to determine a reference maximum input limit, $P_{lim,j}$, in dBm for each beam such that the radio frequency exposure level at a minimum distance $d_0$ complies with the MPE power density limits. In some cases, the input limit $P_{lim,j}$ may be the transmission power to be used by a device that is not configured with sensors 435 for detecting human tissue. However, as the systems described herein support techniques using the sensors 435 to detect objects 435 and determine if the objects 435 contain human tissue, the wireless device 415 may determine a transmit power greater than the $P_{lim,j}$ based on the techniques described herein.

Techniques described herein provide for the wireless device 415 to use the detected locations of human tissue to determine (e.g., calculate) a maximum transmit power at which the wireless device 415 is able to transmit using each beam while satisfying the MPE threshold, To perform the calculation for a given traffic beam, the wireless device 415 may determine an average compliance transmission power for beam management purposes, $P_{max,BM,j}$, in dBm, for each transmission interval i (e.g., for each TTI) based on the detected locations of human tissue. The wireless device 415 may scan the stored locations at which human tissue has been detected within a sensor coverage area 430 that is aligned with the respective beam using the sensor view characterization process described with reference to FIG. 3. The wireless device 415 may determine a minimum distance at which human tissue has been detected within each respective sensor coverage area 430 of each beam as described in Equation 3.

$$d_{min,j} = \min_{\forall d_k \in D \; AND \; (\theta_k, \varphi_k) \in S_{d_{max,j}}} d_k \quad (3)$$

In the example of Equation 3, the wireless device 415 may find the minimum distance (e.g., $d_{min,j}$) from among all distances (e.g., $d_k$) in the set list of distances D within the sensor coverage area 430 (e.g., closer than or at the distance $d_{max,j}$). The distance $d_{min,j}$ may be the minimum distance between the sensors 435 and an object 435 including human tissue. The wireless device 415 may determine the distance $d_{min,j}$ based on the distance $d_{max,j}$ as the wireless device 415 may have determined that the probability of detecting an object with human tissue accurately beyond that distance may not meet the target levels (e.g., as described in the sensor view characterization process described with reference to FIG. 3). After determining the distance $d_{min,j}$, the wireless device 415 may determine the maximum transmit power, $P_{max,BM,j}$, for each beam j. Equation 4 represents an example function for calculating the maximum transmit power for a given beam j.

$$P_{max,BM,j} = P_{lim,j} + 10\log10\left(\frac{PD \; \text{limit}(i)}{RRC \; \text{Duty Cycle}} * \frac{\min(d_{min,j}, d_{max,j})^2}{d_0^2}\right) \quad (4)$$

In the example of Equation 4, the parameter PD limit (i) may represent a normalized power density limit for a current transmission interval i, and the parameter RRC Duty Cycle may represent a configured TDD uplink duty cycle. Based on the wireless device 415 using the sensors 425 to detect the objects 435 and the knowledge of the power density limit and RRC duty cycle, the wireless device 415 may be able to increase the transmit power level by a factor of $$\frac{\min(d_{min,j}, d_{max,j})^2}{d_0^2}$$

relative to a maximum transmit power that may be calculated if the wireless device 415 does not detect locations of human tissue. The factor by which the described techniques may increase the permissible transmit power.

Based on the determination of whether the object 435 includes the human tissue, the wireless device 415 may use Equations 3 and 4 to determine the transmit power to use. For example, if the distance $d_{min,j}$ is a relatively high value (e.g., if the human tissue is relatively far away from the wireless device 415), the $P_{max,BM,j}$ may be relatively high because the wireless device 415 may be able to increase the transmit power due to the human tissue being relatively far away. If the minimum detected distance $d_{min,j}$ is a relatively low value, the wireless device 415 may decrease the transmit power value, $P_{max,BM,j}$, for the traffic beam j to ensure exposure to the relatively close human tissue complies with the MPE threshold.

In some cases, if the transmit power value, $P_{max,BM,j}$, is below a threshold value for the traffic beam j or if there is an object 435 including human tissue in the sensor coverage area 430 of the traffic beam j, the wireless device 415 may determine to switch traffic beams. In some examples, the wireless device 415 may determine to exclude one or more traffic beams that are associated with radio frequency coverage areas or aligned sensor coverage areas that include a detected object 435 with human tissue. For example, if the object 435-a includes human tissue, the wireless device 415 may refrain from selecting and using a beam that is associated with the aligned sensor coverage area 430. After excluding the one or more beams based on detected human tissue, the wireless device 415 may select a traffic beam from the remaining beams based on RSRP measurements of the remaining beams. For example, the wireless device 415 may measure RSRP of each beam of the remaining beams that do not include human tissue and may select a beam that is associated with the highest RSRP compared to the other beams. The wireless device 415 may switch to the selected beam for subsequent communications. The wireless device 415 may determine to switch beams as a way of steering the uplink communication beam to avoid objects 435 including human tissue, which may provide for the wireless device 415 to maintain relatively high transmit powers while reducing exposure to human tissue and complying with an MPE threshold.

In some examples, the wireless device 415 may determine that coverage areas of all of the beams supported by the wireless device include human tissue detected by the sensors 425. Additionally, or alternatively, the object 435 including human tissue detected in a beam may be relatively far away from the sensor 425 and the beam may still be able to increase the transmission power even with an object 435 including human tissue detected. In such cases, for each beam selection interval m, the wireless device 415 may select a beam (e.g., a best uplink serving beam) from the set of beams. The selected beam may be referred to as beam j* in some examples herein. Equations 5 through 7 show example functions for calculating and selecting the beam j*.

$$j^* = \mathrm{argmax}_j ULSNR_j(m) \quad (5)$$

$$UL\,SNR_j(m) = \min(P_{max,BM,j}(m), RF\,MTPL(m)) - PL_j(m) - N(m) \quad (6)$$

$$j^* = \mathrm{argmax}_j \min(P_{max,BM,j}(m), RF\,MTPL(m)) - PL_j(m) \quad (7)$$

In the example of Equation 5, the wireless device 415 may measure an SNR of each beam and may select the beam j* based on an uplink SNR the beam j* being higher than an SNR for the other beams. Equation 6 represents an example function for calculating an average uplink SNR for each beam to use as an input to the calculation of the beam j* as described in Equation 5. For example, Equation 6 may be computed for each beam and then the set of computations (e.g., the set of uplink SNR calculations for each beam) may be input to the arg max function of Equation 5 to determine the beam j*. In determining the average uplink SNR, the wireless device 415 may determine the minimum value of the transmit powers determined by Equation 4 (e.g., $P_{max,BM,j}$) and a RF MTPL (m) which may be a radio frequency maximum transmit power limit (RF MTPL) measured, in dBm, for a given beam selection interval (m). The RF MTPL may be based on a signal waveform, modulation order, and a quantity of RBs at the beam selection interval m. In Equation 6, a measured pathloss of the beam ($PL_j(m)$), measured in dB for beam j at the beam selection interval m and the noise level (N(m)), measured in dBm, at another wireless device at the beam selection interval m may be subtracted from the determined minimum value. The noise level may be a predicted channel noise between the wireless device 415 and the other wireless device and may be common for all beams. Equation 7 represents an example equation for calculating the beam j* using a combination of Equations 5 and 6, but without the noise level (N(m)). The noise may be omitted in Equation 7 because the noise level is not a function of the beams and may be common for all beams.

The wireless device 415 described herein may thereby be equipped with one or more sensors 425 collocated with antenna components 420 at the wireless device 415. The sensors 425 may be configured to detect objects 435 and determine whether the objects 435 include human tissue. The wireless device 415 may use the detected locations at which human tissue is present, along with an aligned sensor coverage area 430 and a radio frequency exposure area of one or more beams, to determine a maximum transmit power at which the wireless device 415 can transmit using each beam. The wireless device 415 may select a beam to use for subsequent communications based on the determined maximum transmit powers, which may provide for the wireless device to improve transmit power selection, improve throughput, improve reliability of communications, and maintain compliance with MPE and other radio frequency exposure thresholds. By using one or more sensors 425 to detect objects 435 including human tissue, the wireless device 415 may detect human tissue more reliably and with relatively small blind spots as compared with using radar, lidar, or sonar systems to detect human tissue.

Figure 5:
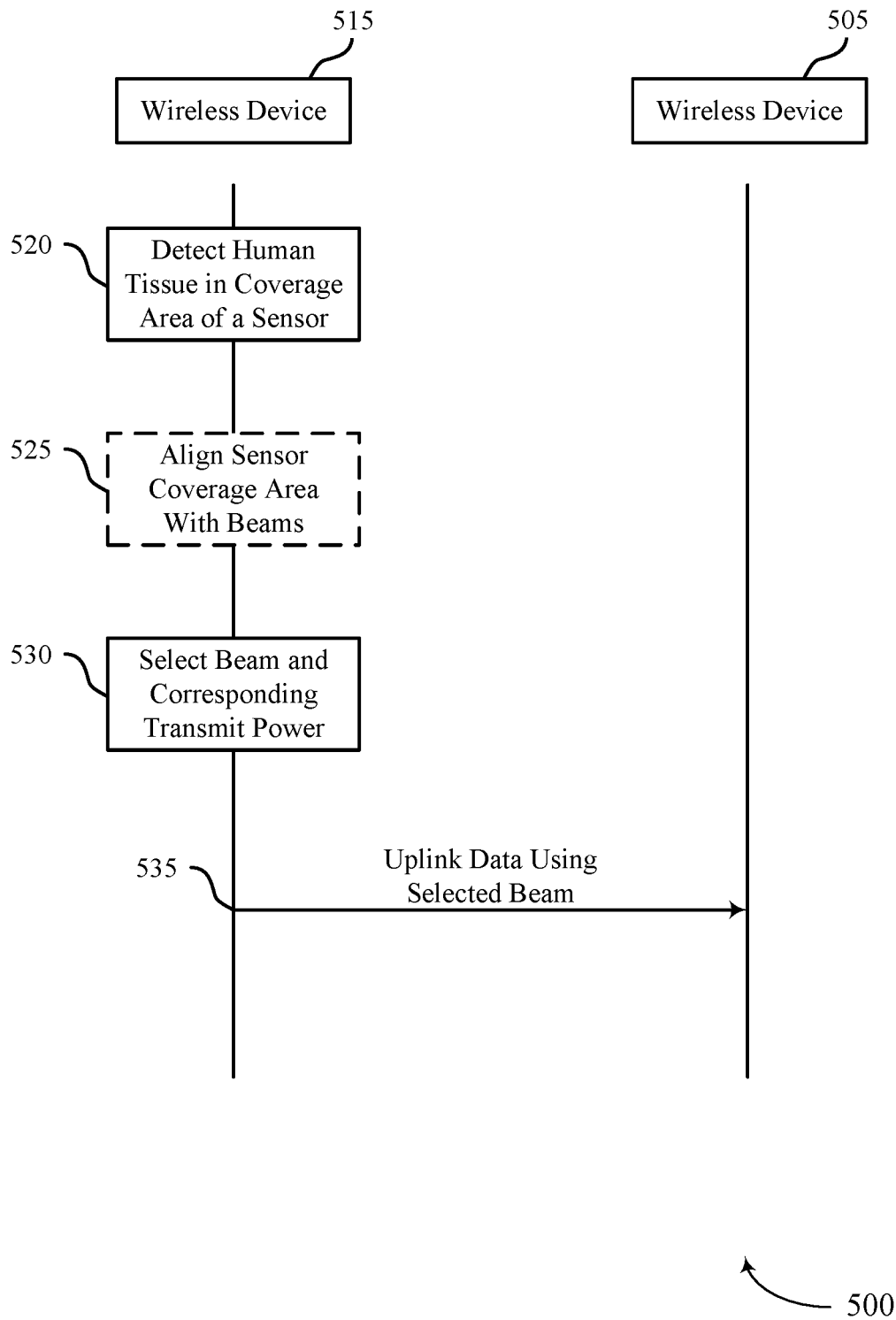
FIG. 5 illustrates an example of a process flow that supports techniques for beam management using sensor coverage in accordance with various aspects of the present disclosure.

FIG. 5 illustrates an example of a process flow 500 that supports techniques for beam management using camera coverage in accordance with various aspects of the present disclosure. In some examples, the process flow 500 may implement or be implemented by the wireless communication system 100 or 200. For example, the process flow 500 may include a wireless device 505 and a wireless device 515, which may represent examples of corresponding devices described herein. In this example, the wireless device 515 may be an example of a UE 115, a CPE, or some other type of device, and the wireless device 505 may be an example of a UE 115 or a network entity 105, or some other type of device. The process flow 500 illustrates communications between the wireless device 515 and the wireless device 505 to detect human tissue and perform beamforming management.

In the following description of the process flow 500, the operations between the wireless device 515 and the wireless device 505 may be performed in different orders or at different times. Some operations may also be left out of the process flow 500, or other operations may be added. Although the wireless device 515 and the wireless device 505 are shown performing the operations of the process flow 500, some aspects of some operations may also be performed by one or more other wireless devices.

At 520, the wireless device 515 may detect, using a sensor at the wireless device 515, one or more locations at which human tissue may be present within a coverage area of the sensor. In some examples, the wireless device may detect one or more objects in a vicinity of the wireless device 515, and the wireless device 515 may store locations of the objects (e.g., in a memory of the wireless device 515). The locations may be associated with a respective distance from the sensor at the wireless device 515 and a respective angular position in a coordinate system associated with the sensor. In some examples, the wireless device 515 may monitor the respective locations of the one or more objects for a threshold time period and determine whether the one or more objects include the human tissue based on monitoring the locations for the threshold time period. For example, if an object does not move by a threshold distance in the threshold time period, the wireless device 515 may assume the object does not include living tissue and the wireless device 515 may remove the location of the object from the memory. If an object moves by at least the threshold distance in the threshold time period, the wireless device 515 may assume the object includes human tissue and may continue to store the location of the human tissue.

In some other examples, the wireless device 515 may use a machine learning algorithm to determine whether detected objects include human tissue. The machine learning algorithm may be trained prior to deployment of the wireless device 515. Additionally, or alternatively, the wireless device 515 may provide one or more inputs to train the machine learning algorithm, such as the distances by which the objects move over time, or other input values. The wireless device 515 may store locations of the objects that include human tissue.

The wireless device 515 may detect the one or more locations at which the human tissue may be present using one sensor or two or more sensors that are collocated with the wireless device 515. The one or more sensors may be, for example, one or more cameras, one or more heat sensors, or some other types of sensors. Each location of human tissue detected by the wireless device 515 may correspond to a respective distance of the human tissue from the sensor and a respective angular position of the human tissue in a coordinate system associated with the sensor, as described with reference to FIGS. 3 and 4. The respective angular position may correspond to an azimuth angle and a polar angle in the coordinate system.

At 525, in some examples, the wireless device 515 may align, for each beam of a set of beams supported by the wireless device 515, at least a portion of the coverage area of the sensor with a respective radio frequency coverage area of the beam. In some examples, aligning the first portion of the coverage area of the sensor with the radio frequency coverage area of the beam may include determining a maximum allowable distance from the sensor for beam management. In some cases, a probability that the sensor will detect a presence of the human tissue at any distance less than the maximum allowable distance may be greater than or equal to a threshold probability. Additionally, or alternatively, aligning the first portion of the coverage area of the sensor with the radio frequency coverage area of the beam may include determining a maximum area over which a total maximum effective isotropic power radiated from the wireless device 515 using the beam satisfies a threshold EIRP condition, as described in further detail with reference to FIG. 3. The maximum area may correspond to a range of angular coordinates and the first portion of the coverage area of the sensor may include all points included in a volume defined by the maximum allowable distance from the sensor and the range of angular coordinates. In some examples, the sensors may have multiple different aligned coverage areas, each aligned with a respective beam. Additionally, or alternatively, a coverage area of the sensors may be divided into multiple aligned portions, each portion aligned with a respective beam. In such cases, the portions may be partially overlapping or nonoverlapping in space.

At 530, the wireless device 515 may select from among the set of beams, a beam and a corresponding transmit power. The beam and the transmit power may be selected based at least on the detection of the one or more locations at which the human tissue may be present within the coverage area of the sensor and a radio frequency coverage area of the beam. In some cases, selecting the beam and the transmit power may be based at least on aligning the first portion of the coverage area of the sensor with the radio frequency coverage area of the beam. For example, after aligning the first portion of the coverage area of the sensor with the radio frequency coverage area of the beam, the wireless device 515 may determine a minimum distance at which human tissue was detected within the first portion of the coverage area of the sensor, and the wireless device 515 may calculate a maximum transmit power that can be used for transmissions via the beam based on the minimum distance. The wireless device 515 may similarly determine maximum transmit powers for other potential beams. The wireless device 515 may select the beam and the corresponding transmit power based on a comparison with the other beams, based on RSRP measurements of the beams, based on the beam not including human tissue in a corresponding radio frequency coverage area of the beam, or any combination thereof.

At 535, the wireless device 515 may transmit uplink data using the selected beam and the selected transmit power. By selecting the beam and the corresponding transmit power based on the detected locations of human tissue as described herein, the wireless device 515 may ensure that uplink transmissions using the selected beam comply with radio frequency exposure regulations while maximizing uplink transmit power and throughput. The one or more sensors at the wireless device 515 may thereby provide for the wireless device 515 to accurately detect objects, determine whether the objects include human tissue, and perform beam management while complying with radio frequency exposure regulations.

Figure 6:
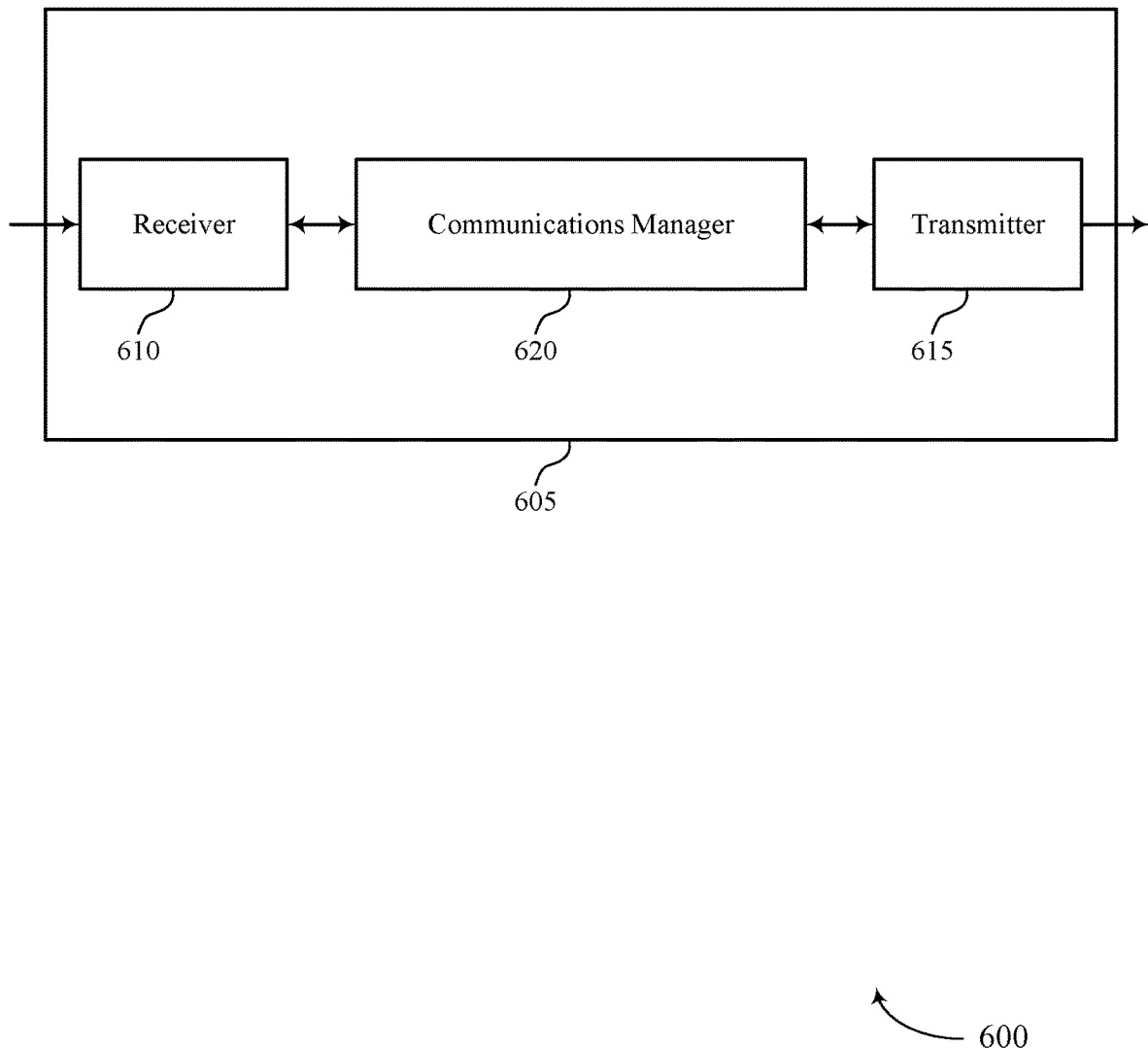
FIGS. 6 and 7 illustrate block diagrams of devices that support techniques for beam management using sensor coverage in accordance with various aspects of the present disclosure.

FIG. 6 illustrates a block diagram 600 of a device 605 that supports techniques for beam management using sensor coverage in accordance with various aspects of the present disclosure. The device 605 may be an example of aspects of a UE 115 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beam management using sensor coverage). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beam management using sensor coverage). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for beam management using sensor coverage as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a wireless device in accordance with examples as disclosed herein. For example, the communications manager 620 may be configured as or otherwise support a means for detecting, using a sensor at the wireless device, one or more locations at which human tissue is present within a coverage area of the sensor. The communications manager 620 may be configured as or otherwise support a means for selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The communications manager 620 may be configured as or otherwise support a means for transmitting uplink data using the selected beam and the selected transmit power.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources and increased communication performance.

Figure 7:
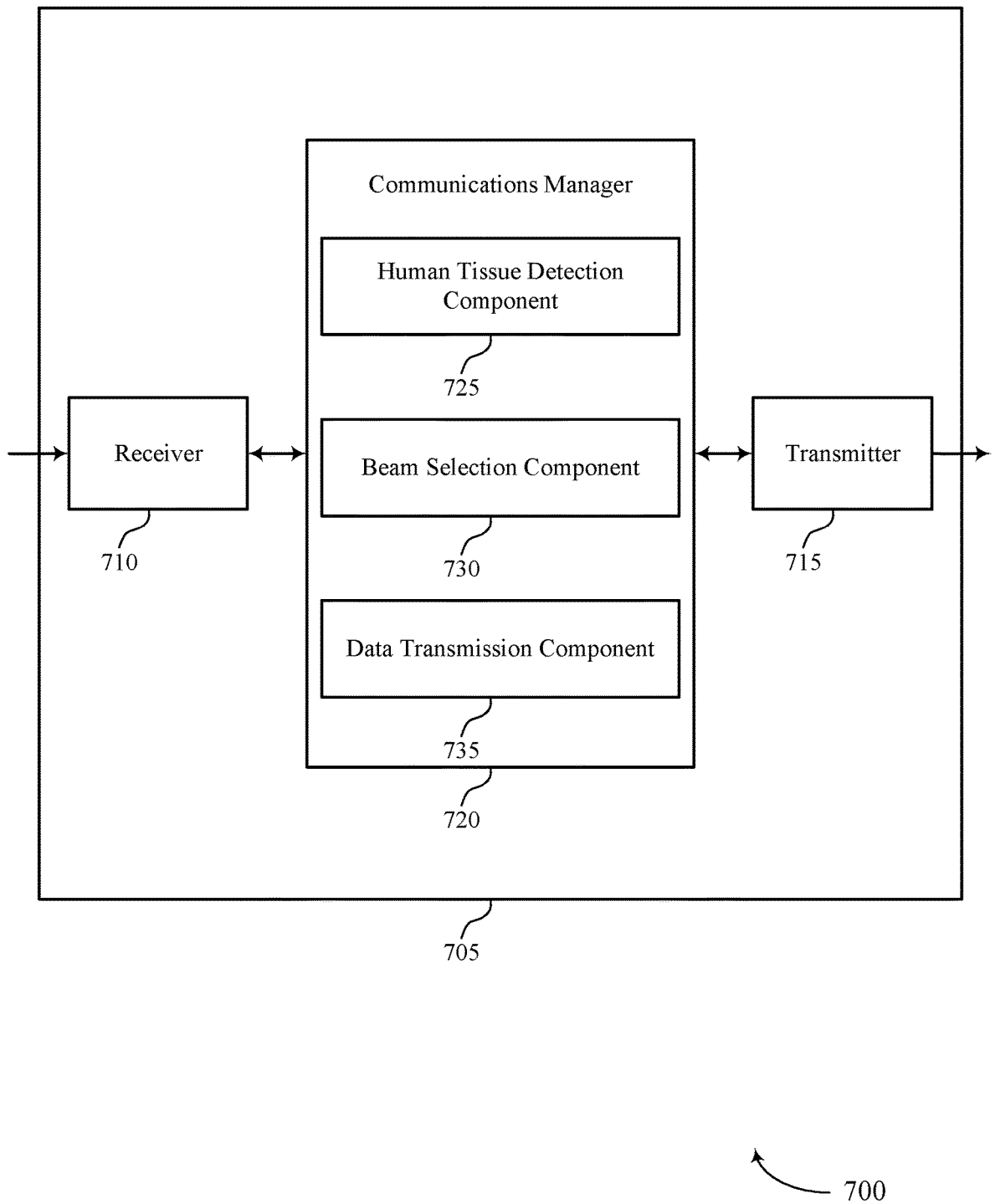

FIG. 7 illustrates a block diagram 700 of a device 705 that supports techniques for beam management using sensor coverage in accordance with various aspects of the present disclosure. The device 705 may be an example of aspects of a device 605, a UE 115, or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for beam management using sensor coverage). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for beam management using sensor coverage). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for beam management using sensor coverage as described herein. For example, the communications manager 720 may include a human tissue detection component 725, a beam selection component 730, a data transmission component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a wireless device in accordance with examples as disclosed herein. The human tissue detection component 725 may be configured as or otherwise support a means for detecting, using a sensor at the wireless device, one or more locations at which human tissue is present within a coverage area of the sensor. The beam selection component 730 may be configured as or otherwise support a means for selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The data transmission component 735 may be configured as or otherwise support a means for transmitting uplink data using the selected beam and the selected transmit power.

Figure 8:
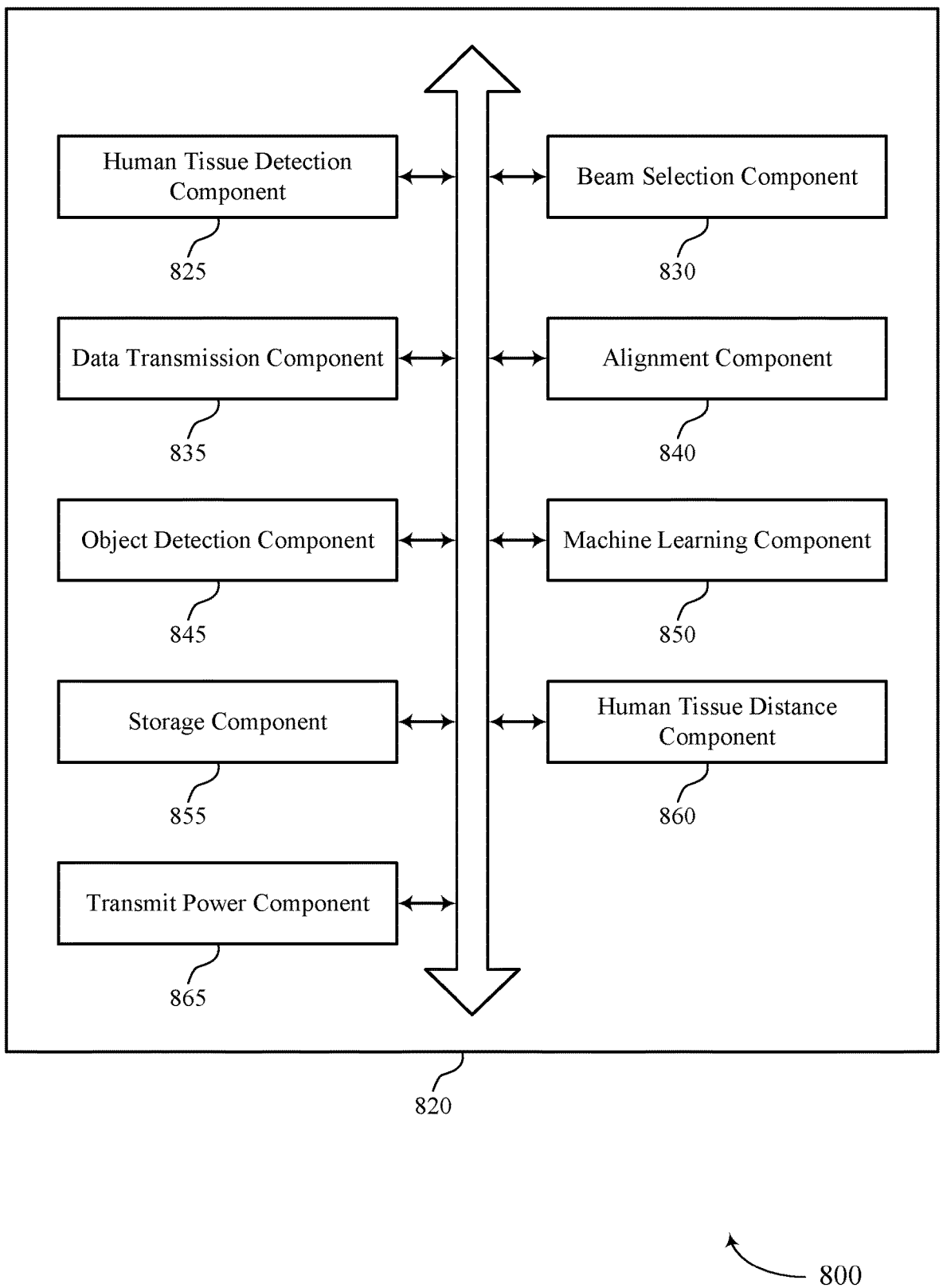
FIG. 8 illustrates a block diagram of a communications manager that supports techniques for beam management using sensor coverage in accordance with various aspects of the present disclosure.

FIG. 8 illustrates a block diagram 800 of a communications manager 820 that supports techniques for beam management using sensor coverage in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for beam management using sensor coverage as described herein. For example, the communications manager 820 may include a human tissue detection component 825, a beam selection component 830, a data transmission component 835, an alignment component 840, an object detection component 845, a machine learning component 850, a storage component 855, a human tissue distance component 860, a transmit power component 865, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communication at a wireless device in accordance with examples as disclosed herein. The human tissue detection component 825 may be configured as or otherwise support a means for detecting, using a sensor at the wireless device, one or more locations at which human tissue is present within a coverage area of the sensor. The beam selection component 830 may be configured as or otherwise support a means for selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The data transmission component 835 may be configured as or otherwise support a means for transmitting uplink data using the selected beam and the selected transmit power.

In some examples, the alignment component 840 may be configured as or otherwise support a means for aligning, for each beam of the set of multiple beams supported by the wireless device, at least a portion of the coverage area of the sensor with a respective radio frequency coverage area, where selecting the beam and the transmit power is based on aligning a first portion of the coverage area of the sensor with the radio frequency coverage area of the beam.

In some examples, to support aligning the first portion of the coverage area of the sensor with the radio frequency coverage area of the beam, the alignment component 840 may be configured as or otherwise support a means for determining a maximum allowable distance from the sensor for beam management, where a probability that the sensor will detect a presence of the human tissue at any distance less than the maximum allowable distance is greater than or equal to a threshold probability. In some examples, to support aligning the first portion of the coverage area of the sensor with the radio frequency coverage area of the beam, the alignment component 840 may be configured as or otherwise support a means for determining a maximum area over which a total maximum effective isotropic power radiated from the wireless device using the beam satisfies a threshold EIRP condition, where the maximum area corresponds to a range of angular coordinates, and where the first portion of the coverage area of the sensor includes all points included in a volume defined by the maximum allowable distance from the sensor and the range of angular coordinates.

In some examples, the alignment component 840 may be configured as or otherwise support a means for determining a difference between the total maximum effective isotropic power radiated from the wireless device using the beam and a maximum effective isotropic power radiated from the wireless device using the beam at angular coordinates outside of the range of angular coordinates associated with the maximum area, where the threshold EIRP condition corresponds to the difference being greater than or equal to a threshold, the threshold based on the maximum allowable distance and a second distance associated with a MPE limit in an absence of the sensor for the wireless device.

In some examples, the human tissue detection component 825 may be configured as or otherwise support a means for determining that a subset of the one or more locations at which the human tissue is present are included in the first portion of the coverage area of the sensor that is aligned with the radio frequency coverage area of the beam, where each location is associated with a respective distance from the sensor. In some examples, the human tissue distance component 860 may be configured as or otherwise support a means for determining, from among the subset of the one or more locations, a first location based on a first distance from the sensor to the first location being less than other distances from the sensor to other locations of the subset of the one or more locations. In some examples, the transmit power component 865 may be configured as or otherwise support a means for determining the transmit power for the beam based on the first distance from the sensor to the first location.

In some examples, to support selecting the beam, the beam selection component 830 may be configured as or otherwise support a means for selecting, from among the set of multiple beams supported by the wireless device, a subset of one or more beams based on absence of the detected human tissue within respective coverage areas associated with the subset of one or more beams. In some examples, to support selecting the beam, the beam selection component 830 may be configured as or otherwise support a means for selecting the beam from among the subset of one or more beams based on an RSRP of the beam being greater than other RSRPs of other beams of the subset of one or more beams.

In some examples, to support selecting the beam, the beam selection component 830 may be configured as or otherwise support a means for selecting the beam based on an SNR associated with the beam being greater than other SNRs associated with other beams of the set of multiple beams supported by the wireless device.

In some examples, the transmit power component 865 may be configured as or otherwise support a means for determining the transmit power for the beam based on the one or more locations at which the human tissue is present within the sensor coverage for the beam, a maximum allowable distance from the sensor for the beam, a distance associated with an MPE limit in an absence of the sensor for the wireless device, a reference maximum transmit power limit for the beam in an absence of the sensor, a normalized power density limit for a subsequent uplink transmission interval, and a configured TDD uplink duty cycle, where the transmit power includes a maximum transmit power for the beam. In some examples, the transmit power component 865 may be configured as or otherwise support a means for determining the SNR based on the maximum transmit power for the beam, a maximum radio frequency transmit power limit for the wireless device, and a pathloss associated with the beam.

In some examples, the object detection component 845 may be configured as or otherwise support a means for detecting respective locations of one or more objects within the coverage area of the sensor. In some examples, the machine learning component 850 may be configured as or otherwise support a means for determining, based on a machine learning algorithm, whether the one or more detected objects include the human tissue, where detecting the one or more locations at which the human tissue is present is based on the machine learning algorithm. In some examples, the storage component 855 may be configured as or otherwise support a means for storing, at the wireless device, the one or more locations at which the human tissue is present based on the determining, where each of the one or more locations is associated with a respective distance from the sensor and a respective angular position in a coordinate system associated with the sensor.

In some examples, the object detection component 845 may be configured as or otherwise support a means for detecting respective locations of one or more objects within the coverage area of the sensor. In some examples, the object detection component 845 may be configured as or otherwise support a means for monitoring the respective locations of the one or more objects for a threshold time period. In some examples, the human tissue detection component 825 may be configured as or otherwise support a means for determining whether the one or more objects include the human tissue based on monitoring the respective locations of the one or more objects during the threshold time period, where detecting the one or more locations at which the human tissue is present is based on determining whether the one or more objects include the human tissue.

In some examples, the storage component 855 may be configured as or otherwise support a means for storing, at the wireless device, a first location of a first object of the one or more detected objects based on the first location of the first object moving by at least a threshold distance within the threshold time period, where the one or more locations include at least the first location.

In some examples, the human tissue detection component 825 may be configured as or otherwise support a means for determining that a first object of the one or more detected objects does not include the human tissue based on the first object remaining within a threshold distance of a first location of the first object during the threshold time period, where the one or more locations exclude the first location based on the determining.

In some examples, to support detecting the one or more locations at which the human tissue is present, the human tissue detection component 825 may be configured as or otherwise support a means for detecting, using one or more cameras that are collocated with the wireless device, the one or more locations at which the human tissue is present, where the sensor includes the one or more cameras.

In some examples, each location of the one or more locations corresponds to a respective distance of the human tissue from the sensor and a respective angular position of the human tissue in a coordinate system associated with the sensor. In some examples, the respective angular position corresponds to an azimuth angle and a polar angle in the coordinate system.

Figure 9:
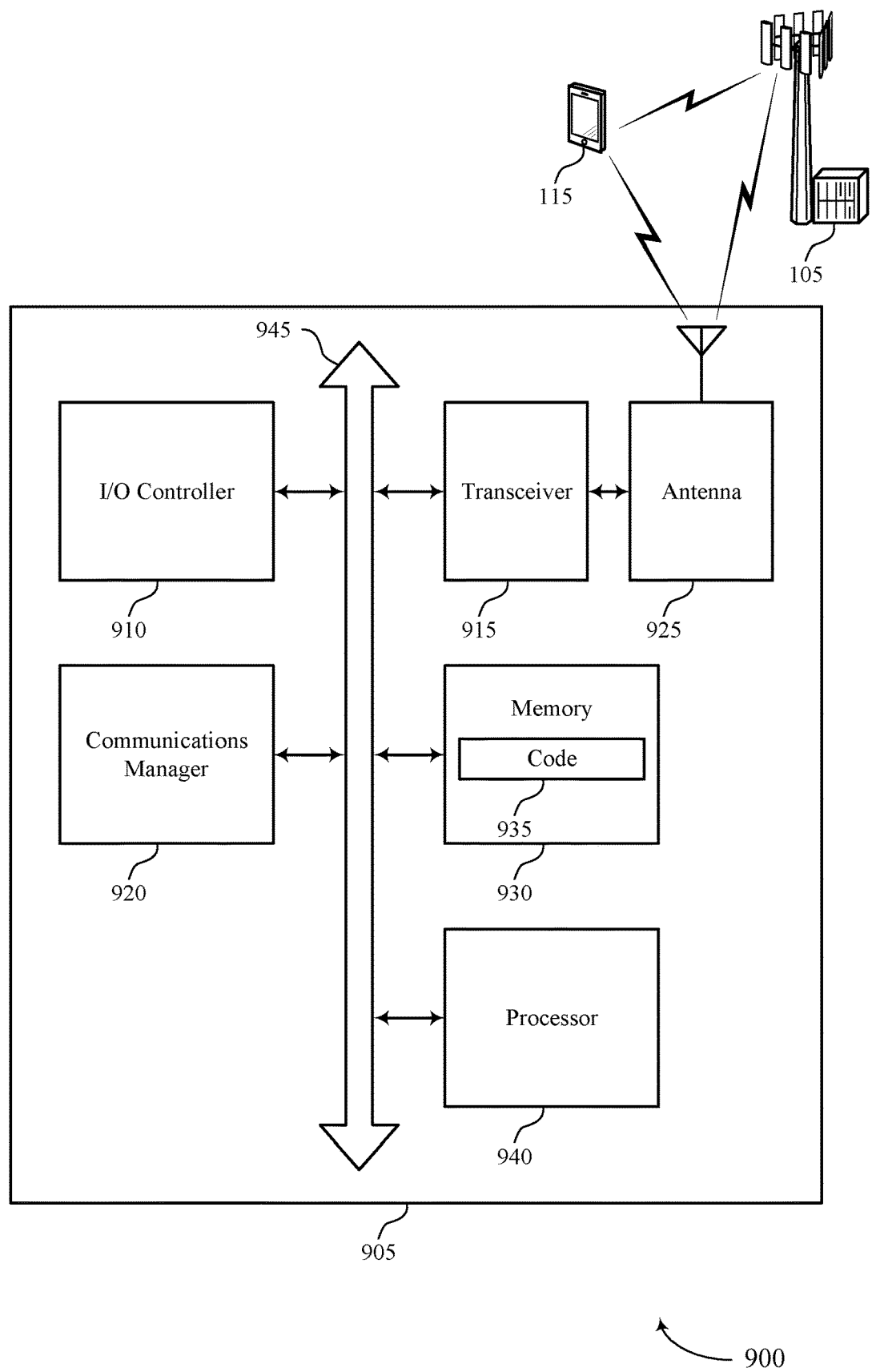
FIG. 9 illustrates a diagram of a system including a network entity that supports techniques for beam management using sensor coverage in accordance with various aspects of the present disclosure.

FIG. 9 illustrates a diagram of a system 900 including a device 905 that supports techniques for beam management using sensor coverage in accordance with various aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for beam management using sensor coverage). For example, the device 905 or a component of the device 905 may include a processor 940 and memory 930 coupled with or to the processor 940, the processor 940 and memory 930 configured to perform various functions described herein.

The communications manager 920 may support wireless communication at a wireless device in accordance with examples as disclosed herein. For example, the communications manager 920 may be configured as or otherwise support a means for detecting, using a sensor at the wireless device, one or more locations at which human tissue is present within a coverage area of the sensor. The communications manager 920 may be configured as or otherwise support a means for selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The communications manager 920 may be configured as or otherwise support a means for transmitting uplink data using the selected beam and the selected transmit power.

By including or configuring the communications manager 920 in accordance with examples as described herein, the device 905 may support techniques for improved user experience related to reduced processing, more efficient utilization of communication resources, improved coordination between devices, and increased communication performance.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for beam management using sensor coverage as described herein, or the processor 940 and the memory 930 may be otherwise configured to perform or support such operations.

Figure 10:
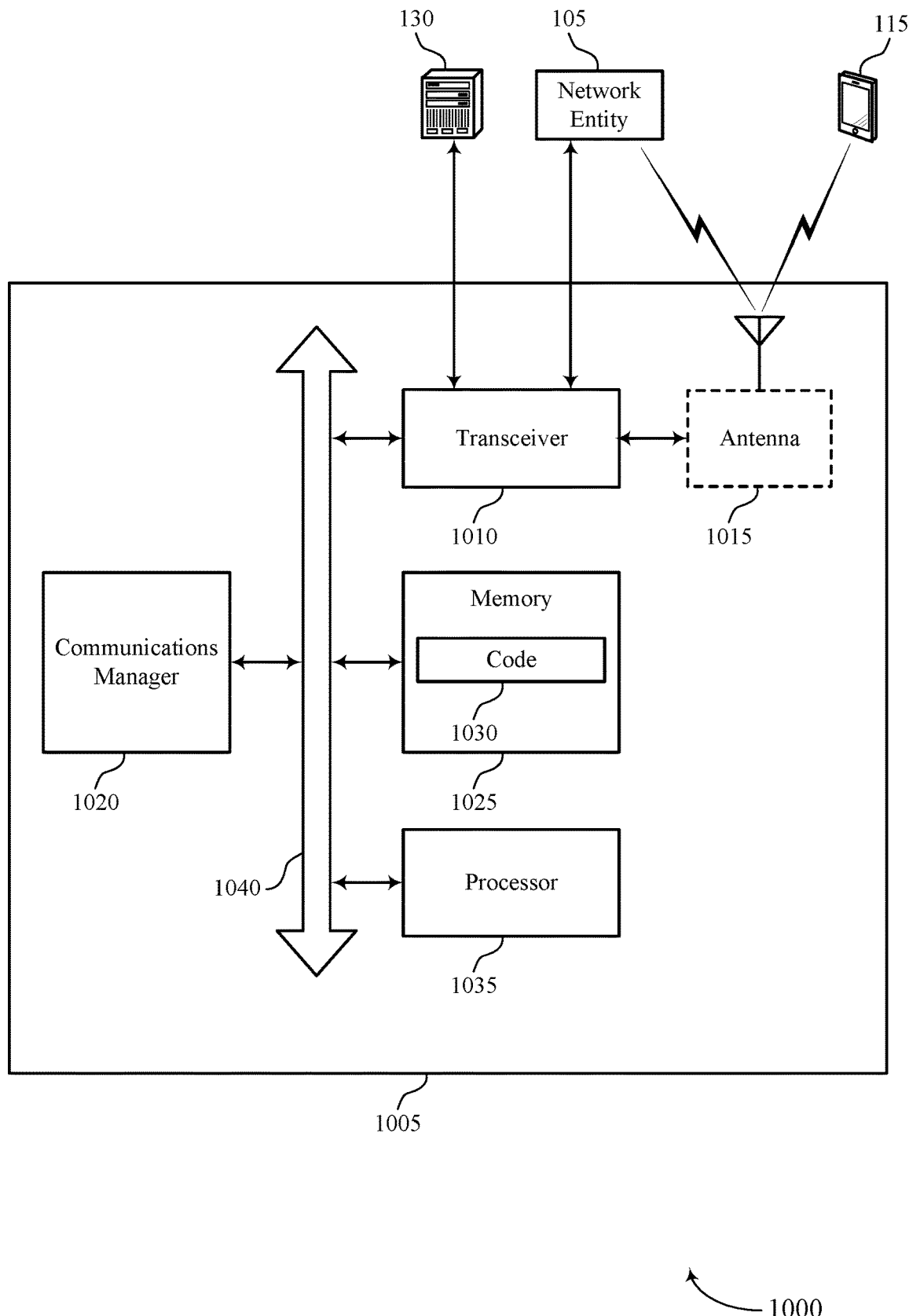
FIG. 10 illustrates a diagram of a system including a UE that supports techniques for beam management using sensor coverage in accordance with various aspects of the present disclosure.

FIG. 10 illustrates a diagram of a system 1000 including a device 1005 that supports techniques for beam management using sensor coverage in accordance with various aspects of the present disclosure. The device 1005 may be an example of or include the components of a device 605, a device 705, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting techniques for beam management using sensor coverage). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1005 may transmit information output from the chip or modem. Additionally, or alternatively, in some implementations, the one or more interfaces may refer to an interface between the processing system of the chip or modem and a receiver, such that the device 1005 may obtain information or signal inputs, and the information may be passed to the processing system. A person having ordinary skill in the art will readily recognize that a first interface also may obtain information or signal inputs, and a second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communication at a wireless device in accordance with examples as disclosed herein. For example, the communications manager 1020 may be configured as or otherwise support a means for detecting, using a sensor at the wireless device, one or more locations at which human tissue is present within a coverage area of the sensor. The communications manager 1020 may be configured as or otherwise support a means for selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The communications manager 1020 may be configured as or otherwise support a means for transmitting uplink data using the selected beam and the selected transmit power.

By including or configuring the communications manager 1020 in accordance with examples as described herein, the device 1005 may support techniques for improved user experience related to reduced processing, more efficient utilization of communication resources, improved coordination between devices, and increased communication performance.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, the processor 1035, the memory 1025, the code 1030, or any combination thereof. For example, the code 1030 may include instructions executable by the processor 1035 to cause the device 1005 to perform various aspects of techniques for beam management using sensor coverage as described herein, or the processor 1035 and the memory 1025 may be otherwise configured to perform or support such operations.

Figure 11:
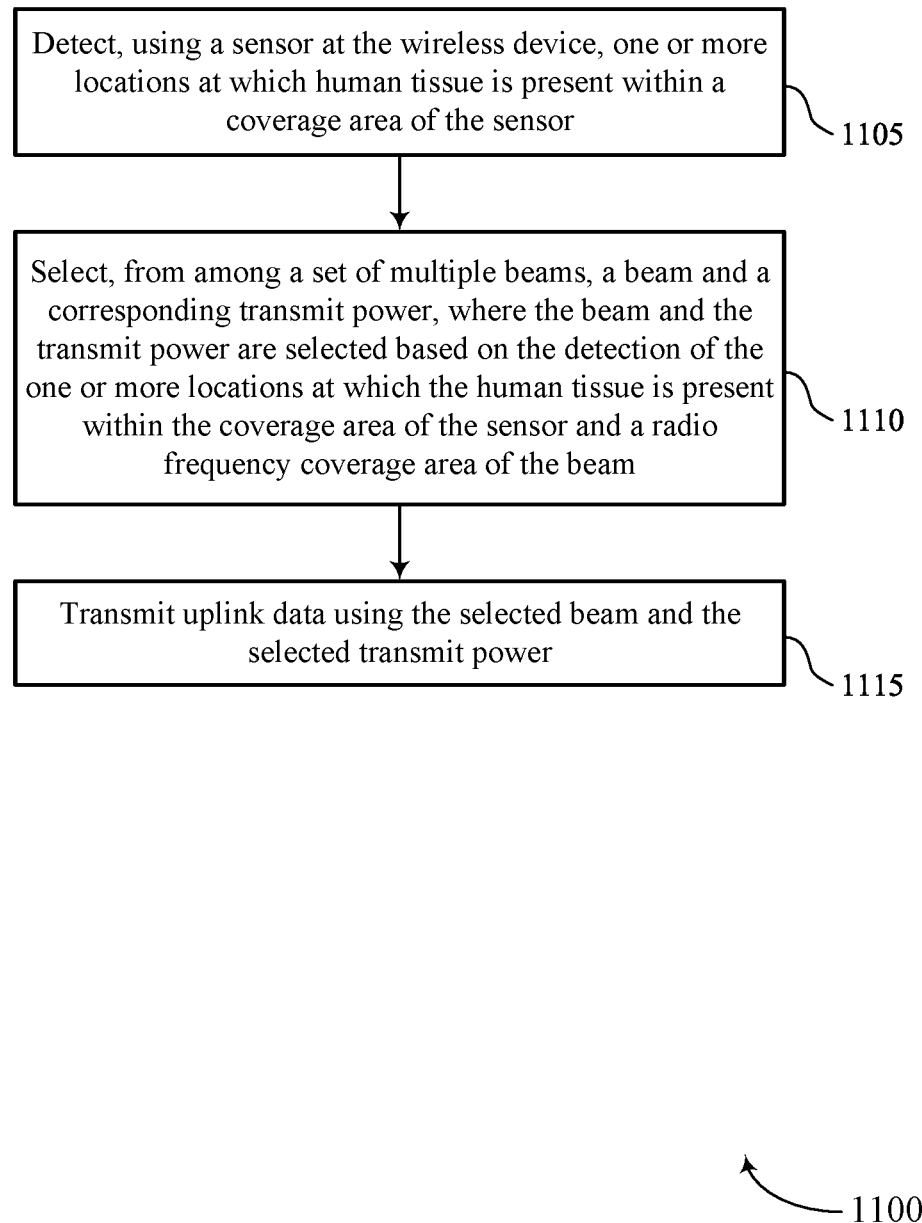
FIGS. 11 through 14 illustrate flowcharts showing methods that support techniques for beam management using sensor coverage in accordance with various aspects of the present disclosure.

FIG. 11 illustrates a flowchart showing a method 1100 that supports techniques for beam management using sensor coverage in accordance with various aspects of the present disclosure. The operations of the method 1100 may be implemented by a UE or a network entity or its components as described herein. For example, the operations of the method 1100 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include detecting, using a sensor at the wireless device, one or more locations at which human tissue is present within a coverage area of the sensor. The operations of 1105 may be performed in accordance with examples as disclosed herein. In some examples, aspects of the operations of 1105 may be performed by a human tissue detection component 825 as described with reference to FIG. 8.

At 1110, the method may include selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The operations of 1110 may be performed in accordance with examples as disclosed herein. In some examples, aspects of the operations of 1110 may be performed by a beam selection component 830 as described with reference to FIG. 8.

At 1115, the method may include transmitting uplink data using the selected beam and the selected transmit power. The operations of 1115 may be performed in accordance with examples as disclosed herein. In some examples, aspects of the operations of 1115 may be performed by a data transmission component 835 as described with reference to FIG. 8.

Figure 12:
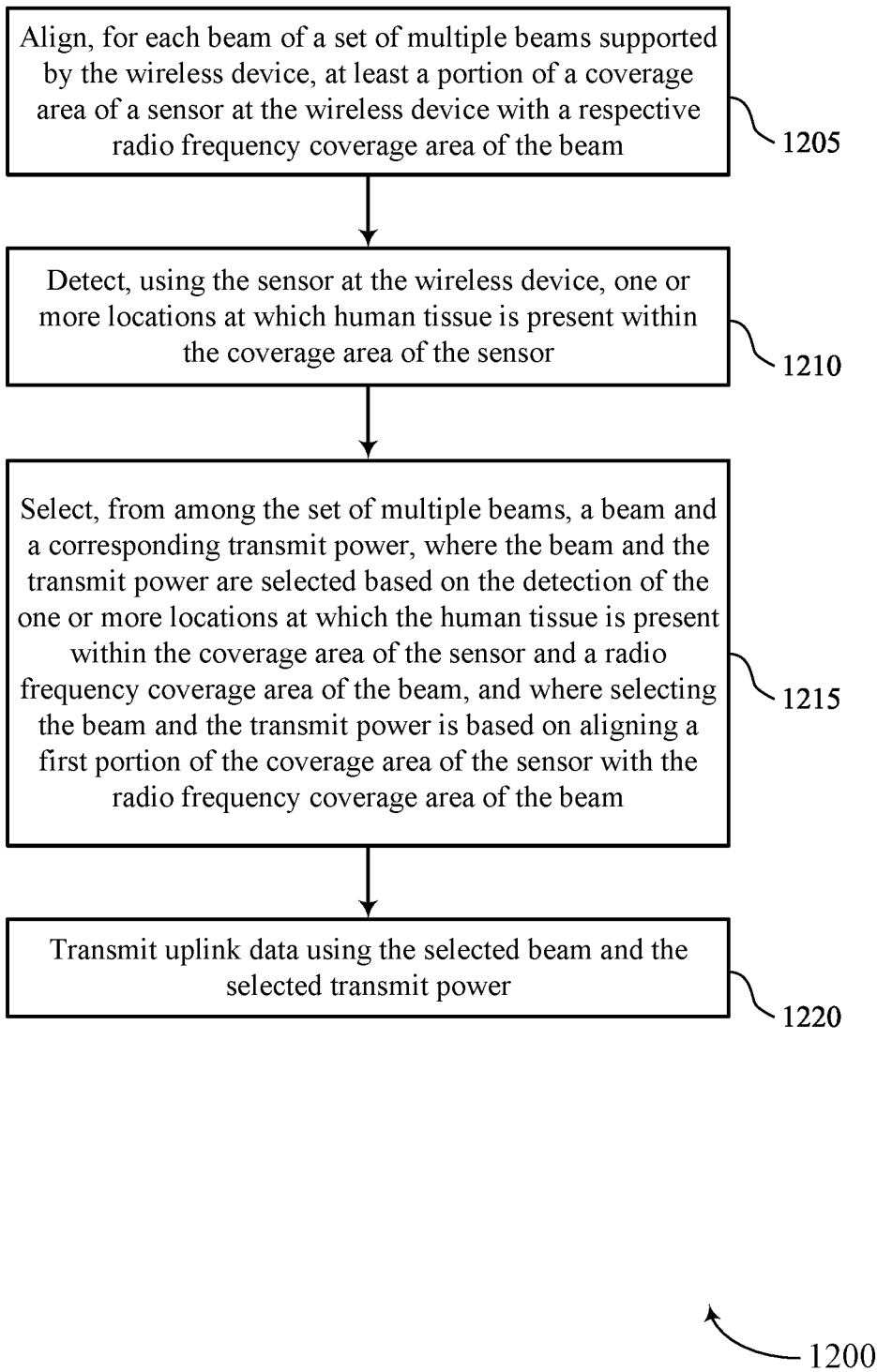

FIG. 12 illustrates a flowchart showing a method 1200 that supports techniques for beam management using sensor coverage in accordance with various aspects of the present disclosure. The operations of the method 1200 may be implemented by a UE or a network entity or its components as described herein. For example, the operations of the method 1200 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include aligning, for each beam of a set of multiple beams supported by the wireless device, at least a portion of a coverage area of a sensor at the wireless device with a respective radio frequency coverage area of the beam. The operations of 1205 may be performed in accordance with examples as disclosed herein. In some examples, aspects of the operations of 1205 may be performed by an alignment component 840 as described with reference to FIG. 8.

At 1210, the method may include detecting, using the sensor at the wireless device, one or more locations at which human tissue is present within the coverage area of the sensor. The operations of 1210 may be performed in accordance with examples as disclosed herein. In some examples, aspects of the operations of 1210 may be performed by a human tissue detection component 825 as described with reference to FIG. 8.

At 1215, the method may include selecting, from among the set of multiple beams, a beam and a corresponding transmit power, where the beam and the transmit power are selected based on the detection of the one or more locations at which the human tissue is present within the coverage area of the sensor and a radio frequency coverage area of the beam, and where selecting the beam and the transmit power is based on aligning a first portion of the coverage area of the sensor with the radio frequency coverage area of the beam. The operations of 1215 may be performed in accordance with examples as disclosed herein. In some examples, aspects of the operations of 1215 may be performed by a beam selection component 830 as described with reference to FIG. 8.

At 1220, the method may include transmitting uplink data using the selected beam and the selected transmit power. The operations of 1220 may be performed in accordance with examples as disclosed herein. In some examples, aspects of the operations of 1220 may be performed by a data transmission component 835 as described with reference to FIG. 8.

Figure 13:
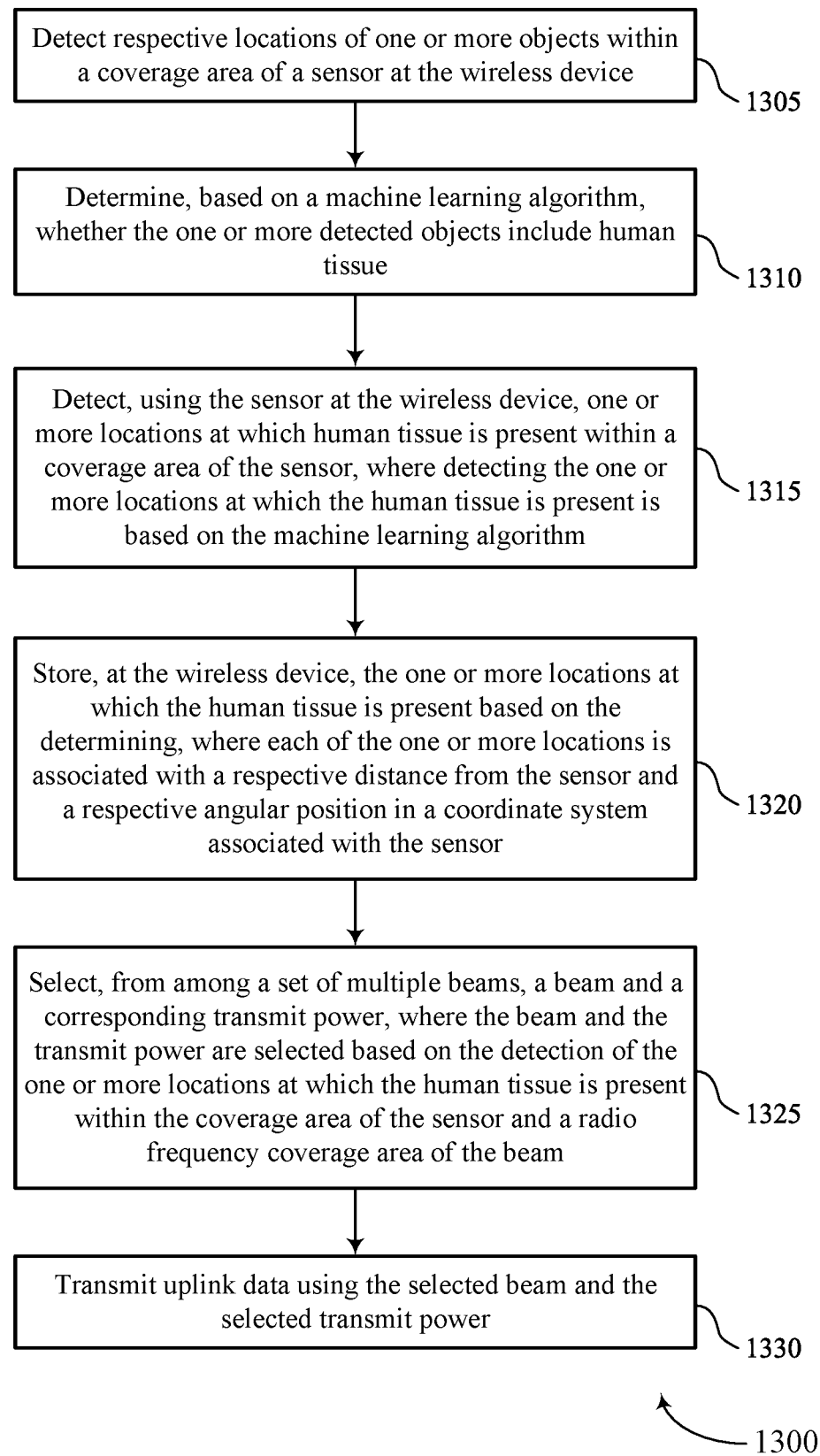

FIG. 13 illustrates a flowchart showing a method 1300 that supports techniques for beam management using sensor coverage in accordance with various aspects of the present disclosure. The operations of the method 1300 may be implemented by a UE or a network entity or its components as described herein. For example, the operations of the method 1300 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include detecting respective locations of one or more objects within a coverage area of a sensor at the wireless device. The operations of 1305 may be performed in accordance with examples as disclosed herein. In some examples, aspects of the operations of 1305 may be performed by an object detection component 845 as described with reference to FIG. 8.

At 1310, the method may include determining, based on a machine learning algorithm, whether the one or more detected objects include human tissue. The operations of 1310 may be performed in accordance with examples as disclosed herein. In some examples, aspects of the operations of 1310 may be performed by a machine learning component 850 as described with reference to FIG. 8.

At 1315, the method may include detecting, using the sensor at the wireless device, one or more locations at which human tissue is present within the coverage area of the sensor, where detecting the one or more locations at which the human tissue is present is based on the machine learning algorithm. The operations of 1315 may be performed in accordance with examples as disclosed herein. In some examples, aspects of the operations of 1315 may be performed by a human tissue detection component 825 as described with reference to FIG. 8.

At 1320, the method may include storing, at the wireless device, the one or more locations at which the human tissue is present based on the determining, where each of the one or more locations is associated with a respective distance from the sensor and a respective angular position in a coordinate system associated with the sensor. The operations of 1320 may be performed in accordance with examples as disclosed herein. In some examples, aspects of the operations of 1320 may be performed by a storage component 855 as described with reference to FIG. 8.

At 1325, the method may include selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The operations of 1325 may be performed in accordance with examples as disclosed herein. In some examples, aspects of the operations of 1325 may be performed by a beam selection component 830 as described with reference to FIG. 8.

At 1330, the method may include transmitting uplink data using the selected beam and the selected transmit power. The operations of 1330 may be performed in accordance with examples as disclosed herein. In some examples, aspects of the operations of 1330 may be performed by a data transmission component 835 as described with reference to FIG. 8.

Figure 14:
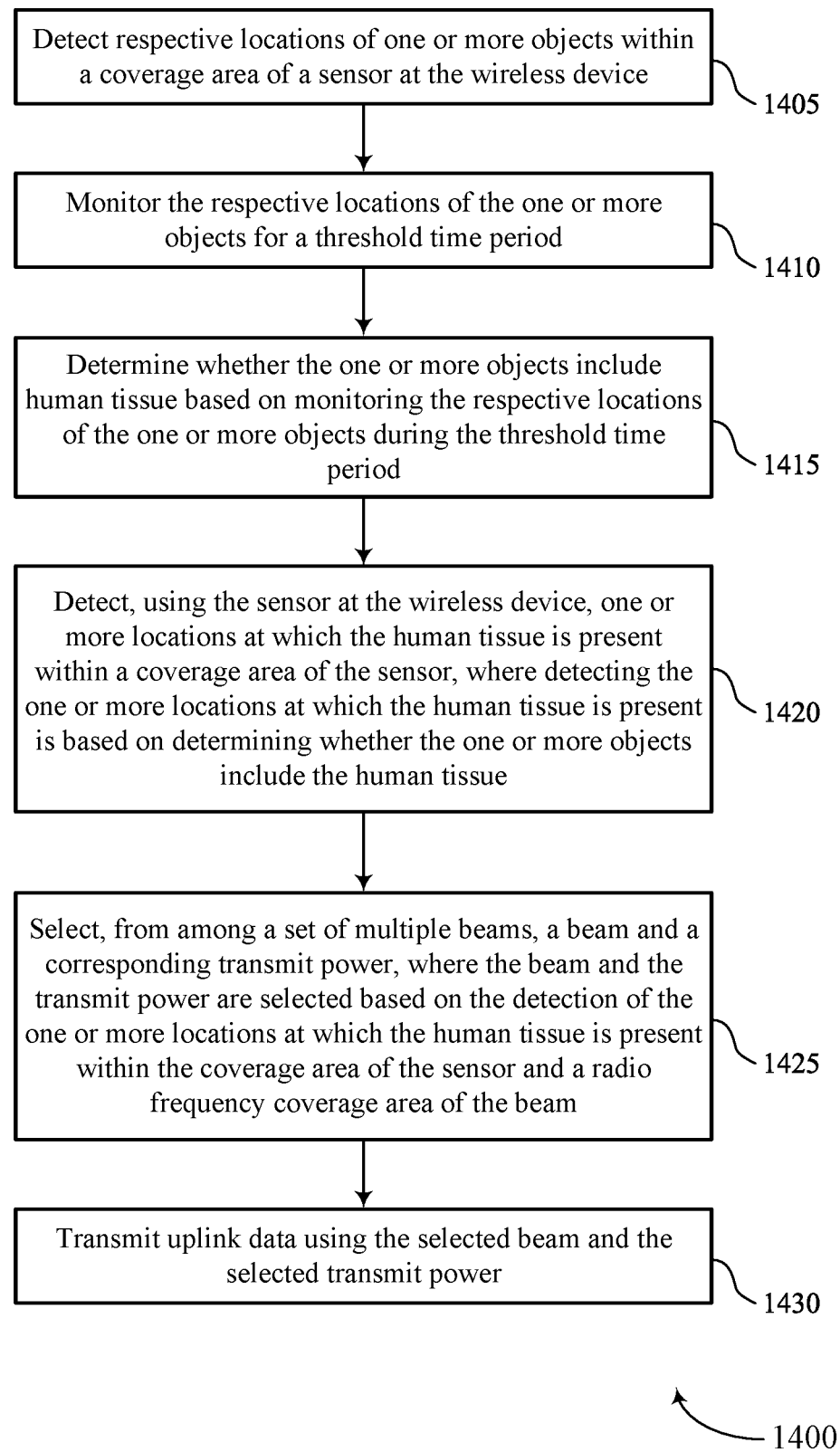

FIG. 14 illustrates a flowchart showing a method 1400 that supports techniques for beam management using sensor coverage in accordance with various aspects of the present disclosure. The operations of the method 1400 may be implemented by a UE or a network entity or its components as described herein. For example, the operations of the method 1400 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include detecting respective locations of one or more objects within a coverage area of a sensor at the wireless device. The operations of 1405 may be performed in accordance with examples as disclosed herein. In some examples, aspects of the operations of 1405 may be performed by an object detection component 845 as described with reference to FIG. 8.

At 1410, the method may include monitoring the respective locations of the one or more objects for a threshold time period. The operations of 1410 may be performed in accordance with examples as disclosed herein. In some examples, aspects of the operations of 1410 may be performed by an object detection component 845 as described with reference to FIG. 8.

At 1415, the method may include determining whether the one or more objects include human tissue based on monitoring the respective locations of the one or more objects during the threshold time period. The operations of 1415 may be performed in accordance with examples as disclosed herein. In some examples, aspects of the operations of 1415 may be performed by a human tissue detection component 825 as described with reference to FIG. 8.

At 1420, the method may include detecting, using the sensor at the wireless device, one or more locations at which the human tissue is present within the coverage area of the sensor, where detecting the one or more locations at which the human tissue is present is based on determining whether the one or more objects include the human tissue. The operations of 1420 may be performed in accordance with examples as disclosed herein. In some examples, aspects of the operations of 1420 may be performed by a human tissue detection component 825 as described with reference to FIG. 8.

At 1425, the method may include selecting, from among a set of multiple beams, a beam and a corresponding transmit power, where the beam and the transmit power are selected based on the detection of the one or more locations at which the human tissue is present within the coverage area of the sensor and a radio frequency coverage area of the beam. The operations of 1425 may be performed in accordance with examples as disclosed herein. In some examples, aspects of the operations of 1425 may be performed by a beam selection component 830 as described with reference to FIG. 8.

At 1430, the method may include transmitting uplink data using the selected beam and the selected transmit power. The operations of 1430 may be performed in accordance with examples as disclosed herein. In some examples, aspects of the operations of 1430 may be performed by a data transmission component 835 as described with reference to FIG. 8.

The following provides an overview of aspects of the present disclosure:

Aspect 1: A method for wireless communication at a wireless device, comprising: detecting, using a sensor at the wireless device, one or more locations at which human tissue is present within a coverage area of the sensor; selecting, from among a plurality of beams, a beam and a corresponding transmit power, wherein the beam and the transmit power are selected based at least in part on the detection of the one or more locations at which the human tissue is present within the coverage area of the sensor and a radio frequency coverage area of the beam; and transmitting uplink data using the selected beam and the selected transmit power.

Aspect 2: The method of aspect 1, further comprising: aligning, for each beam of the plurality of beams supported by the wireless device, at least a portion of the coverage area of the sensor with a respective radio frequency coverage area, wherein selecting the beam and the transmit power is based at least in part on aligning a first portion of the coverage area of the sensor with the radio frequency coverage area of the beam.

Aspect 3: The method of aspect 2, wherein aligning the first portion of the coverage area of the sensor with the radio frequency coverage area of the beam comprises: determining a maximum allowable distance from the sensor for beam management, wherein a probability that the sensor will detect a presence of the human tissue at any distance less than the maximum allowable distance is greater than or equal to a threshold probability; and determining a maximum area over which a total maximum effective isotropic power radiated from the wireless device using the beam satisfies a threshold EIRP condition, wherein the maximum area corresponds to a range of angular coordinates, and wherein the first portion of the coverage area of the sensor includes all points included in a volume defined by the maximum allowable distance from the sensor and the range of angular coordinates.

Aspect 4: The method of aspect 3, further comprising: determining a difference between the total maximum effective isotropic power radiated from the wireless device using the beam and a maximum effective isotropic power radiated from the wireless device using the beam at angular coordinates outside of the range of angular coordinates associated with the maximum area, wherein the threshold EIRP condition corresponds to the difference being greater than or equal to a threshold, the threshold based at least in part on the maximum allowable distance and a second distance associated with an MPE limit in an absence of the sensor for the wireless device.

Aspect 5: The method of any of aspects 2 through 4, further comprising: determining that a subset of the one or more locations at which the human tissue is present are included in the first portion of the coverage area of the sensor that is aligned with the radio frequency coverage area of the beam, wherein each location is associated with a respective distance from the sensor; determining, from among the subset of the one or more locations, a first location based at least in part on a first distance from the sensor to the first location being less than other distances from the sensor to other locations of the subset of the one or more locations; and determining the transmit power for the beam based at least in part on the first distance from the sensor to the first location.

Aspect 6: The method of any of aspects 1 through 5, wherein selecting the beam comprises: selecting, from among the plurality of beams supported by the wireless device, a subset of one or more beams based at least in part on absence of the detected human tissue within respective coverage areas associated with the subset of one or more beams; and selecting the beam from among the subset of one or more beams based at least in part on an RSRP of the beam being greater than other RSRPs of other beams of the subset of one or more beams.

Aspect 7: The method of any of aspects 1 through 5, wherein selecting the beam comprises: selecting the beam based at least in part on an SNR associated with the beam being greater than other SNRs associated with other beams of the plurality of beams supported by the wireless device.

Aspect 8: The method of aspect 7, further comprising: determining the transmit power for the beam based at least in part on the one or more locations at which the human tissue is present within the sensor coverage for the beam, a maximum allowable distance from the sensor for the beam, a distance associated with a MPE limit in an absence of the sensor for the wireless device, a reference maximum transmit power limit for the beam in an absence of the sensor, a normalized power density limit for a subsequent uplink transmission interval, and a configured time-division duplex uplink duty cycle, wherein the transmit power includes a maximum transmit power for the beam; and determining the SNR based at least in part on the maximum transmit power for the beam, a maximum radio frequency transmit power limit for the wireless device, and a pathloss associated with the beam.

Aspect 9: The method of any of aspects 1 through 8, further comprising: detecting respective locations of one or more objects within the coverage area of the sensor; determining, based at least in part on a machine learning algorithm, whether the one or more detected objects include the human tissue, wherein detecting the one or more locations at which the human tissue is present is based at least in part on the machine learning algorithm; and storing, at the wireless device, the one or more locations at which the human tissue is present based at least in part on the determining, wherein each of the one or more locations is associated with a respective distance from the sensor and a respective angular position in a coordinate system associated with the sensor.

Aspect 10: The method of any of aspects 1 through 8, further comprising: detecting respective locations of one or more objects within the coverage area of the sensor; monitoring the respective locations of the one or more objects for a threshold time period; and determining whether the one or more objects include the human tissue based at least in part on monitoring the respective locations of the one or more objects during the threshold time period, wherein detecting the one or more locations at which the human tissue is present is based at least in part on determining whether the one or more objects comprise the human tissue.

Aspect 11: The method of aspect 10, further comprising: storing, at the wireless device, a first location of a first object of the one or more detected objects based at least in part on the first location of the first object moving by at least a threshold distance within the threshold time period, wherein the one or more locations include at least the first location.

Aspect 12: The method of aspect 10, further comprising: determining that a first object of the one or more detected objects does not include the human tissue based at least in part on the first object remaining within a threshold distance of a first location of the first object during the threshold time period, wherein the one or more locations exclude the first location based at least in part on the determining.

Aspect 13: The method of any of aspects 1 through 12, wherein detecting the one or more locations at which the human tissue is present comprises: detecting, using one or more cameras that are collocated with the wireless device, the one or more locations at which the human tissue is present, wherein the sensor comprises the one or more cameras.

Aspect 14: The method of any of aspects 1 through 13, wherein each location of the one or more locations corresponds to a respective distance of the human tissue from the sensor and a respective angular position of the human tissue in a coordinate system associated with the sensor; and the respective angular position corresponds to an azimuth angle and a polar angle in the coordinate system.

Aspect 15: An apparatus for wireless communication at a wireless device, comprising a processor; memory coupled with the processor; and instructions stored in the memory and executable by the processor to cause the apparatus to perform a method of any of aspects 1 through 14.

Aspect 16: An apparatus for wireless communication at a wireless device, comprising at least one means for performing a method of any of aspects 1 through 14.

Aspect 17: A non-transitory computer-readable medium storing code for wireless communication at a wireless device, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless device, comprising:
   detecting, using a sensor at the wireless device and based at least in part on a machine learning algorithm, one or more locations at which human tissue is present within a coverage area of the sensor;
   selecting, from among a plurality of beams, a beam and a corresponding transmit power, wherein the beam and the corresponding transmit power are selected based at least in part on the detection of the one or more locations at which the human tissue is present within the coverage area of the sensor and a radio frequency coverage area of the beam; and
   transmitting uplink data using the selected beam and the selected corresponding transmit power.

2. The method of claim 1, further comprising:
   aligning, for each beam of the plurality of beams supported by the wireless device, at least a portion of the coverage area of the sensor with a respective radio frequency coverage area, wherein selecting the beam and the corresponding transmit power is based at least in part on aligning a first portion of the coverage area of the sensor with the radio frequency coverage area of the beam.

3. The method of claim 2, wherein aligning the first portion of the coverage area of the sensor with the radio frequency coverage area of the beam comprises:
   determining a maximum allowable distance from the sensor for beam management, wherein a probability that the sensor will detect a presence of the human tissue at any distance less than the maximum allowable distance is greater than or equal to a threshold probability; and
   determining a maximum area over which a total maximum effective isotropic power radiated from the wireless device using the beam satisfies a threshold effective isotropic radiated power condition, wherein the maximum area corresponds to a range of angular coordinates, and wherein the first portion of the coverage area of the sensor includes all points included in a volume defined by the maximum allowable distance from the sensor and the range of angular coordinates.

4. The method of claim 3, further comprising:
   determining a difference between the total maximum effective isotropic power radiated from the wireless device using the beam and a maximum effective isotropic power radiated from the wireless device using the beam at angular coordinates outside of the range of angular coordinates associated with the maximum area, wherein the threshold effective isotropic radiated power condition corresponds to the difference being greater than or equal to a threshold, the threshold based at least in part on the maximum allowable distance and a second distance associated with a maximum permissible exposure limit in an absence of the sensor for the wireless device.

5. The method of claim 2, further comprising:
   determining that a subset of the one or more locations at which the human tissue is present are included in the first portion of the coverage area of the sensor that is aligned with the radio frequency coverage area of the beam, wherein each location is associated with a respective distance from the sensor;
   determining, from among the subset of the one or more locations, a first location based at least in part on a first distance from the sensor to the first location being less than other distances from the sensor to other locations of the subset of the one or more locations; and
   determining the corresponding transmit power for the beam based at least in part on the first distance from the sensor to the first location.

6. The method of claim 1, wherein selecting the beam comprises:
   selecting, from among the plurality of beams supported by the wireless device, a subset of one or more beams based at least in part on absence of the detected human tissue within respective coverage areas associated with the subset of one or more beams; and
   selecting the beam from among the subset of one or more beams based at least in part on a reference signal received power of the beam being greater than other reference signal received powers of other beams of the subset of one or more beams.

7. The method of claim 1, wherein selecting the beam comprises:
   selecting the beam based at least in part on a signal-to-noise ratio associated with the beam being greater than other signal-to-noise ratios associated with other beams of the plurality of beams supported by the wireless device.

8. The method of claim 7, further comprising:
   determining the corresponding transmit power for the beam based at least in part on the one or more locations at which the human tissue is present within the coverage area of the sensor for the beam, a maximum allowable distance from the sensor for the beam, a distance associated with a maximum permissible exposure limit in an absence of the sensor for the wireless device, a reference maximum transmit power limit for the beam in an absence of the sensor, a normalized power density limit for a subsequent uplink transmission interval, and a configured time-division duplex uplink duty cycle, wherein the corresponding transmit power includes a maximum transmit power for the beam; and
   determining the signal-to-noise ratio based at least in part on the maximum transmit power for the beam, a maximum radio frequency transmit power limit for the wireless device, and a pathloss associated with the beam.

9. The method of claim 1, further comprising:
   detecting respective locations of one or more objects within the coverage area of the sensor;
   determining, based at least in part on the machine learning algorithm, whether the one or more detected objects include the human tissue, wherein detecting the one or more locations at which the human tissue is present is based at least in part on the machine learning algorithm; and
   storing, at the wireless device, the one or more locations at which the human tissue is present based at least in part on the determining, wherein each of the one or more locations is associated with a respective distance from the sensor and a respective angular position in a coordinate system associated with the sensor.

10. The method of claim 1, further comprising:
    detecting respective locations of one or more objects within the coverage area of the sensor;

monitoring the respective locations of the one or more objects for a threshold time period; and determining whether the one or more objects include the human tissue based at least in part on monitoring the respective locations of the one or more objects during the threshold time period, wherein detecting the one or more locations at which the human tissue is present is based at least in part on determining whether the one or more objects comprise the human tissue.

11. The method of claim 10, further comprising:

storing, at the wireless device, a first location of a first object of the one or more detected objects based at least in part on the first location of the first object moving by at least a threshold distance within the threshold time period, wherein the one or more locations include at least the first location.

12. The method of claim 10, further comprising:

determining that a first object of the one or more detected objects does not include the human tissue based at least in part on the first object remaining within a threshold distance of a first location of the first object during the threshold time period, wherein the one or more locations exclude the first location based at least in part on the determining.

13. The method of claim 1, wherein detecting the one or more locations at which the human tissue is present comprises:

detecting, using one or more cameras that are collocated with the wireless device, the one or more locations at which the human tissue is present, wherein the sensor comprises the one or more cameras.

14. The method of claim 1, wherein:

each location of the one or more locations corresponds to a respective distance of the human tissue from the sensor and a respective angular position of the human tissue in a coordinate system associated with the sensor; and the respective angular position corresponds to an azimuth angle and a polar angle in the coordinate system.

15. An apparatus for wireless communication at a wireless device, comprising:

a processor;

memory coupled with the processor; and instructions stored in the memory and executable by the processor to cause the apparatus to:

detect, using a sensor at the wireless device and based at least in part on a machine learning algorithm, one or more locations at which human tissue is present within a coverage area of the sensor;

select, from among a plurality of beams, a beam and a corresponding transmit power, wherein the beam and the corresponding transmit power are selected based at least in part on the detection of the one or more locations at which the human tissue is present within the coverage area of the sensor and a radio frequency coverage area of the beam; and transmit uplink data using the selected beam and the selected corresponding transmit power.

16. The apparatus of claim 15, wherein the instructions are further executable by the processor to cause the apparatus to:

align, for each beam of the plurality of beams supported by the wireless device, at least a portion of the coverage area of the sensor with a respective radio frequency coverage area, wherein selecting the beam and the corresponding transmit power is based at least in part on aligning a first portion of the coverage area of the sensor with the radio frequency coverage area of the beam.

17. The apparatus of claim 16, wherein the instructions to align the first portion of the coverage area of the sensor with the radio frequency coverage area of the beam are executable by the processor to cause the apparatus to:

determine a maximum allowable distance from the sensor for beam management, wherein a probability that the sensor will detect a presence of the human tissue at any distance less than the maximum allowable distance is greater than or equal to a threshold probability; and determine a maximum area over which a total maximum effective isotropic power radiated from the wireless device using the beam satisfies a threshold effective isotropic radiated power condition, wherein the maximum area corresponds to a range of angular coordinates, and wherein the first portion of the coverage area of the sensor includes all points included in a volume defined by the maximum allowable distance from the sensor and the range of angular coordinates.

18. The apparatus of claim 17, wherein the instructions are further executable by the processor to cause the apparatus to:

determine a difference between the total maximum effective isotropic power radiated from the wireless device using the beam and a maximum effective isotropic power radiated from the wireless device using the beam at angular coordinates outside of the range of angular coordinates associated with the maximum area, wherein the threshold effective isotropic radiated power condition corresponds to the difference being greater than or equal to a threshold, the threshold based at least in part on the maximum allowable distance and a second distance associated with a maximum permissible exposure limit in an absence of the sensor for the wireless device.

19. The apparatus of claim 16, wherein the instructions are further executable by the processor to cause the apparatus to:

determine that a subset of the one or more locations at which the human tissue is present are included in the first portion of the coverage area of the sensor that is aligned with the radio frequency coverage area of the beam, wherein each location is associated with a respective distance from the sensor;

determine, from among the subset of the one or more locations, a first location based at least in part on a first distance from the sensor to the first location being less than other distances from the sensor to other locations of the subset of the one or more locations; and determine the corresponding transmit power for the beam based at least in part on the first distance from the sensor to the first location.

20. The apparatus of claim 15, wherein the instructions to select the beam are executable by the processor to cause the apparatus to:

select, from among the plurality of beams supported by the wireless device, a subset of one or more beams based at least in part on absence of the detected human tissue within respective coverage areas associated with the subset of one or more beams; and select the beam from among the subset of one or more beams based at least in part on a reference signal received power of the beam being greater than other reference signal received powers of other beams of the subset of one or more beams.

21. The apparatus of claim 15, wherein the instructions to select the beam are executable by the processor to cause the apparatus to:
   select the beam based at least in part on a signal-to-noise ratio associated with the beam being greater than other signal-to-noise ratios associated with other beams of the plurality of beams supported by the wireless device.

22. The apparatus of claim 21, wherein the instructions are further executable by the processor to cause the apparatus to:
   determine the corresponding transmit power for the beam based at least in part on the one or more locations at which the human tissue is present within the coverage area of the sensor for the beam, a maximum allowable distance from the sensor for the beam, a distance associated with a maximum permissible exposure limit in an absence of the sensor for the wireless device, a reference maximum transmit power limit for the beam in an absence of the sensor, a normalized power density limit for a subsequent uplink transmission interval, and a configured time-division duplex uplink duty cycle, wherein the corresponding transmit power includes a maximum transmit power for the beam; and
   determine the signal-to-noise ratio based at least in part on the maximum transmit power for the beam, a maximum radio frequency transmit power limit for the wireless device, and a pathloss associated with the beam.

23. The apparatus of claim 15, wherein the instructions are further executable by the processor to cause the apparatus to:
   detect respective locations of one or more objects within the coverage area of the sensor;
   determine, based at least in part on the machine learning algorithm, whether the one or more detected objects include the human tissue, wherein detecting the one or more locations at which the human tissue is present is based at least in part on the machine learning algorithm; and
   store, at the wireless device, the one or more locations at which the human tissue is present based at least in part on the determining, wherein each of the one or more locations is associated with a respective distance from the sensor and a respective angular position in a coordinate system associated with the sensor.

24. The apparatus of claim 15, wherein the instructions are further executable by the processor to cause the apparatus to:
   detect respective locations of one or more objects within the coverage area of the sensor;
   monitor the respective locations of the one or more objects for a threshold time period; and
   determine whether the one or more objects include the human tissue based at least in part on monitoring the respective locations of the one or more objects during the threshold time period, wherein detecting the one or more locations at which the human tissue is present is based at least in part on determining whether the one or more objects comprise the human tissue.

25. The apparatus of claim 24, wherein the instructions are further executable by the processor to cause the apparatus to:
   store, at the wireless device, a first location of a first object of the one or more detected objects based at least in part on the first location of the first object moving by at least a threshold distance within the threshold time period, wherein the one or more locations include at least the first location.

26. The apparatus of claim 24, wherein the instructions are further executable by the processor to cause the apparatus to:
   determine that a first object of the one or more detected objects does not include the human tissue based at least in part on the first object remaining within a threshold distance of a first location of the first object during the threshold time period, wherein the one or more locations exclude the first location based at least in part on the determining.

27. An apparatus for wireless communication at a wireless device, comprising:
   means for detecting, using a sensor at the wireless device and based at least in part on a machine learning algorithm, one or more locations at which human tissue is present within a coverage area of the sensor;
   means for selecting, from among a plurality of beams, a beam and a corresponding transmit power, wherein the beam and the corresponding transmit power are selected based at least in part on the detection of the one or more locations at which the human tissue is present within the coverage area of the sensor and a radio frequency coverage area of the beam; and
   means for transmitting uplink data using the selected beam and the selected corresponding transmit power.

28. The apparatus of claim 27, further comprising:
   means for aligning, for each beam of the plurality of beams supported by the wireless device, at least a portion of the coverage area of the sensor with a respective radio frequency coverage area, wherein selecting the beam and the corresponding transmit power is based at least in part on aligning a first portion of the coverage area of the sensor with the radio frequency coverage area of the beam.

29. A non-transitory computer-readable medium storing code for wireless communication at a wireless device, the code comprising instructions executable by a processor to:
   detect, using a sensor at the wireless device, one or more locations at which human tissue is present within a coverage area of the sensor;
   select, from among a plurality of beams, a beam and a corresponding transmit power, wherein the beam and the corresponding transmit power are selected based at least in part on the detection of the one or more locations at which the human tissue is present within the coverage area of the sensor and a radio frequency coverage area of the beam; and
   transmit uplink data using the selected beam and the selected corresponding transmit power.

30. The non-transitory computer-readable medium of claim 29, wherein the instructions are further executable by the processor to:
   align, for each beam of the plurality of beams supported by the wireless device, at least a portion of the coverage area of the sensor with a respective radio frequency coverage area, wherein selecting the beam and the corresponding transmit power is based at least in part on aligning a first portion of the coverage area of the sensor with the radio frequency coverage area of the beam.

* * * * *